US012742658B2

(12) United States Patent
Sakano et al.

(10) Patent No.: US 12,742,658 B2
(45) Date of Patent: Sep. 22, 2026

(54) COMPUTING DEVICE, OWN-POSITION ESTIMATING DEVICE, AND MAP INFORMATION GENERATING METHOD

(71) Applicant: HITACHI ASTEMO, LTD., Hitachinaka (JP)

(72) Inventors: Morihiko Sakano, Tokyo (JP); Hideyuki Kume, Hitachinaka (JP); Shigenori Hayase, Hitachinaka (JP); Tatsuhiko Monji, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 58 days.

(21) Appl. No.: 18/723,564

(22) PCT Filed: Nov. 29, 2022

(86) PCT No.: PCT/JP2022/044066
§ 371 (c)(1),
(2) Date: Jun. 24, 2024

(87) PCT Pub. No.: WO2023/139935
PCT Pub. Date: Jul. 27, 2023

(65) Prior Publication Data

US 2025/0052594 A1 Feb. 13, 2025

(30) Foreign Application Priority Data

Jan. 21, 2022 (JP) ................................ 2022-008048

(51) Int. Cl.
*G01C 21/00* (2006.01)

(52) U.S. Cl.
CPC ....... *G01C 21/387* (2020.08); *G01C 21/3844* (2020.08)

(58) Field of Classification Search
CPC .. G01C 21/387; G01C 21/3844; G01C 21/30; G08G 1/0112; G08G 1/09626;
(Continued)

(56) References Cited

U.S. PATENT DOCUMENTS

2005/0046615 A1* 3/2005 Han ..................... G09B 29/106 340/995.13
2005/0159886 A1* 7/2005 Kim ..................... G09B 29/106 340/995.14

(Continued)

FOREIGN PATENT DOCUMENTS

JP H08-247775 A 9/1996
JP 2019-175137 A 10/2019

(Continued)

OTHER PUBLICATIONS

International Search Report with English Translation in corresponding International Application No. PCT/JP2022/044066, dated Jan. 24, 2023.

*Primary Examiner* — Anne Marie Antonucci
*Assistant Examiner* — Patrick Daniel Mohl
(74) *Attorney, Agent, or Firm* — Foley & Lardner LLP

(57) ABSTRACT

A computing device for map generation and vehicle position estimation. The device can generate a periphery map using environment information and movement information. The device can extract, from the periphery map, partial maps. The device can determine a coordinate conversion parameter for each partial map to generate a converted partial map aligned with a reference map. The device can compute, based on coordinate conversion parameters, a gap parameter including information regarding a correlation between the coordinate conversion parameters adjacent to each other. The device can generate a new partial map for a region corresponding to the converted partial map based on an offset between a converted partial map and the reference (Continued)

map being greater than or equal to a threshold. The device can generate, based on a vehicle location, a continuous map by connecting the new partial map with at least one adjacent converted partial map using the gap parameter.

7 Claims, 15 Drawing Sheets

(58) Field of Classification Search
CPC ....... G08G 1/096725; G08G 1/096775; G09B 29/106; G16Y 10/40; G16Y 20/20; G16Y 40/60
See application file for complete search history.

(56) References Cited

U.S. PATENT DOCUMENTS

| | | | | |
|---|---|---|---|---|
| 2010/0023252 | A1* | 1/2010 | Mays | G01C 21/20 701/533 |
| 2020/0050205 | A1* | 2/2020 | McClelland | G01C 21/20 |
| 2021/0245777 | A1 | 8/2021 | Mori | |
| 2022/0165069 | A1* | 5/2022 | Li | G01C 21/3833 |
| 2023/0127893 | A1* | 4/2023 | Ootsuka | G01C 21/32 701/455 |

FOREIGN PATENT DOCUMENTS

| | | | |
|---|---|---|---|
| JP | 2021-128207 | A | 9/2021 |
| WO | WO-2014/076844 | A1 | 5/2014 |

* cited by examiner

FIG. 5

| NAME | COORDINATE SYSTEM |
|---|---|
| REFERENCE MAP 181 | REFERENCE COORDINATE SYSTEM |
| PERIPHERY MAP 141 | VEHICLE MEASUREMENT COORDINATE SYSTEM |
| PARTIAL MAP 143 | VEHICLE MEASUREMENT COORDINATE SYSTEM |
| UNCONFIRMED REGION UP | VEHICLE MEASUREMENT COORDINATE SYSTEM |
| CONVERTED PARTIAL MAP 144 | REFERENCE COORDINATE SYSTEM |
| UNCONFIRMED CONVERTED PARTIAL MAP UQ | REFERENCE COORDINATE SYSTEM |
| PARTIAL MAP GROUP 151 | REFERENCE COORDINATE SYSTEM |

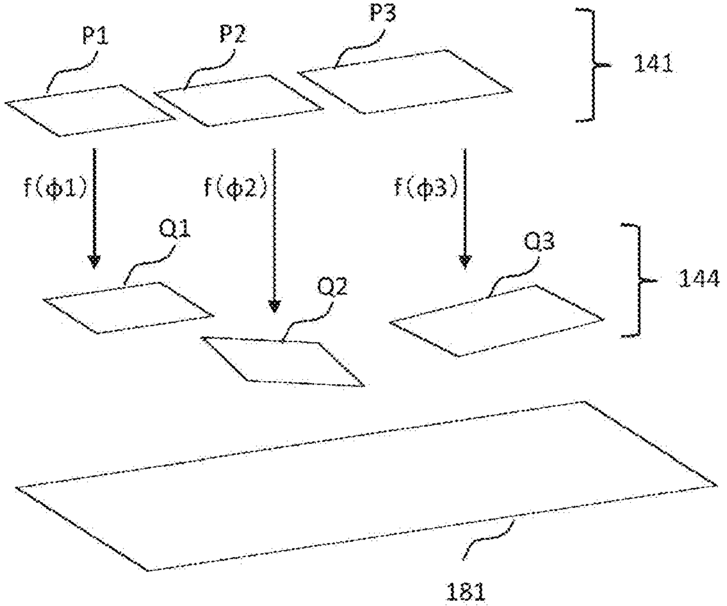

FIG. 8
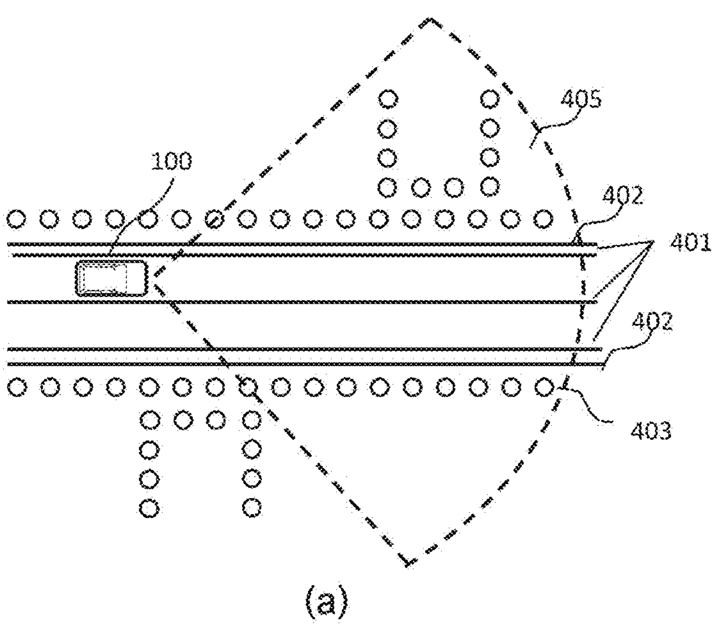
(a)
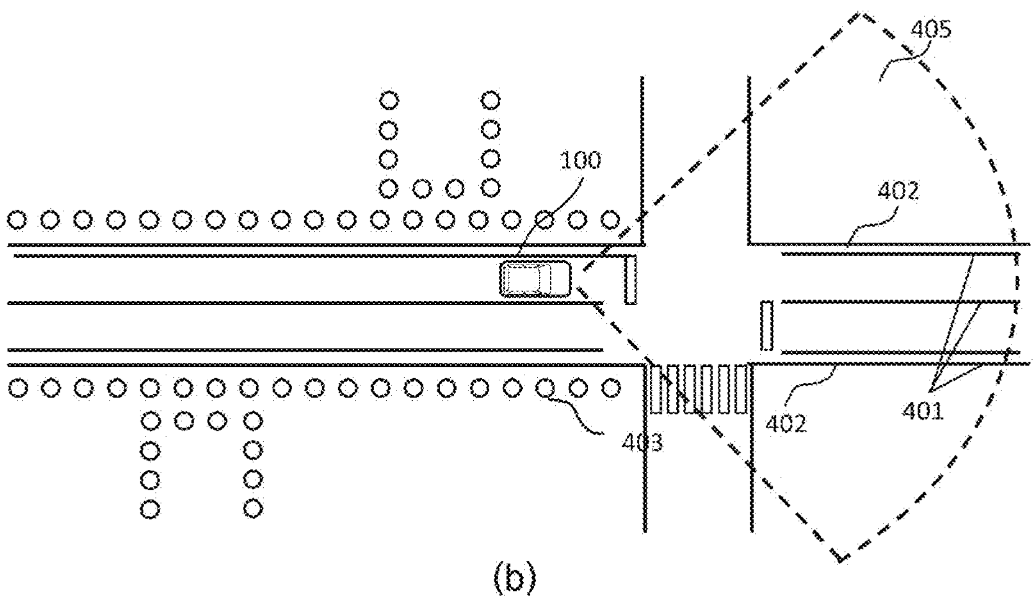
(b)

FIG. 10
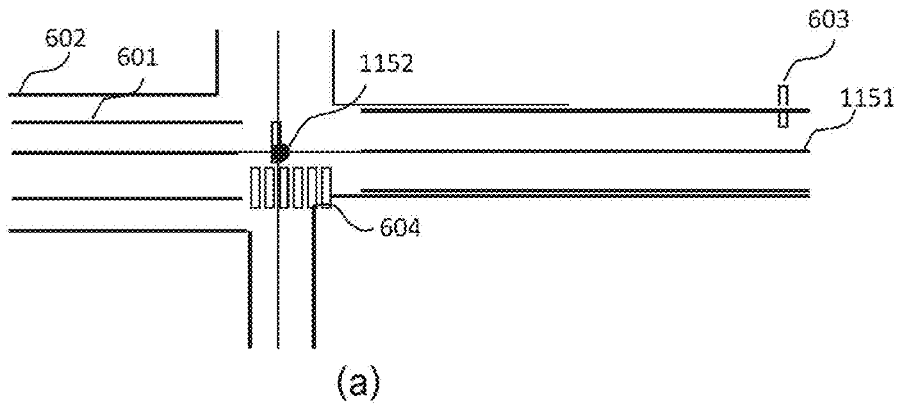
(a)
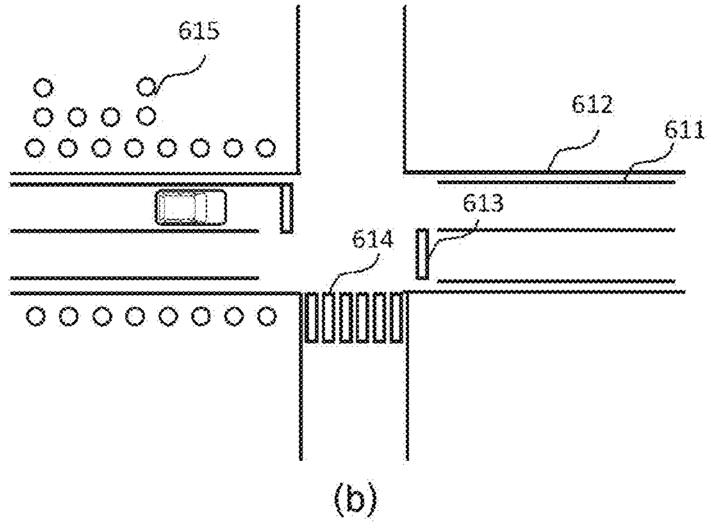
(b)
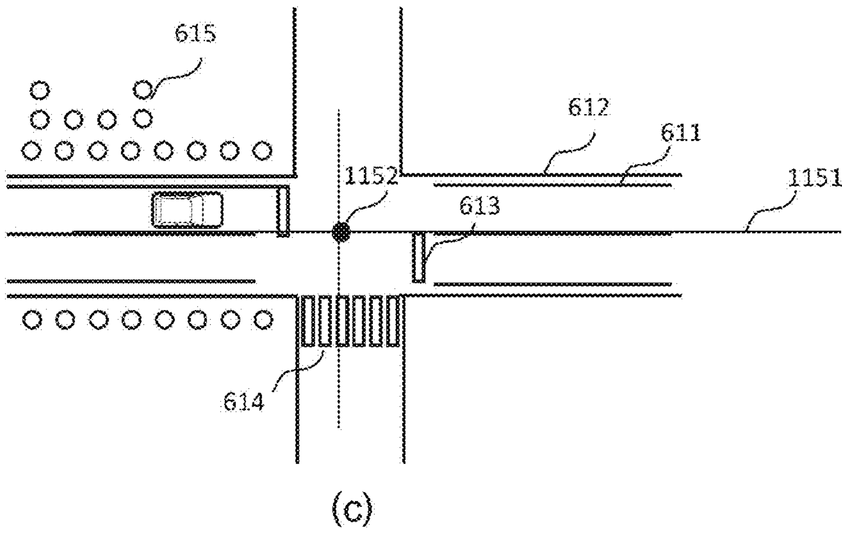
(c)

*FIG. 11*
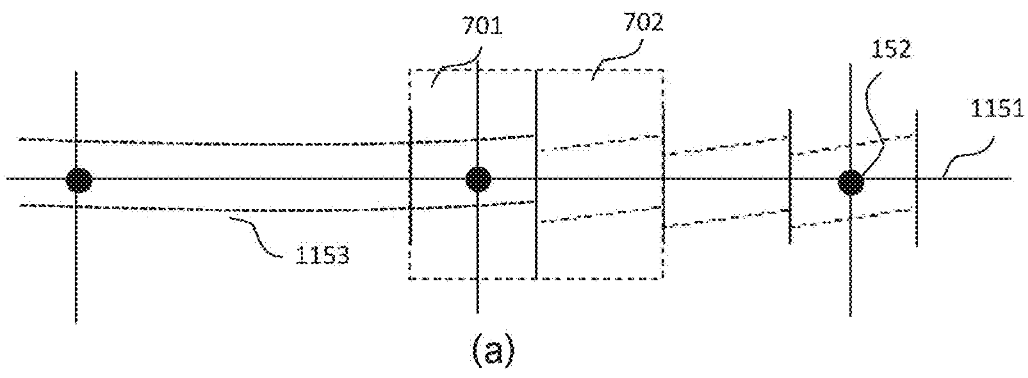
(a)
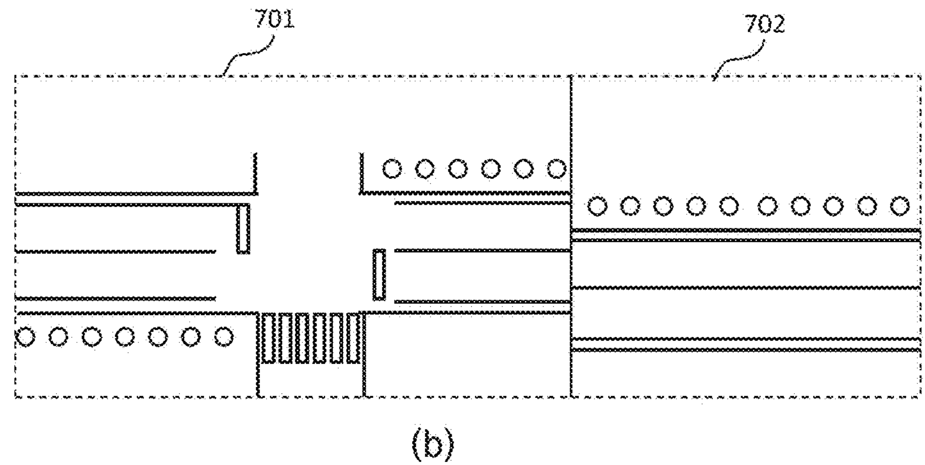
(b)

FIG. 13
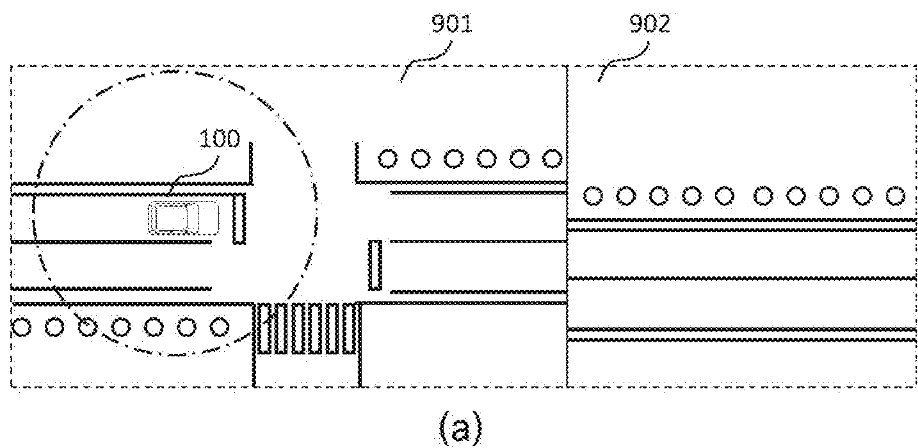
(a)
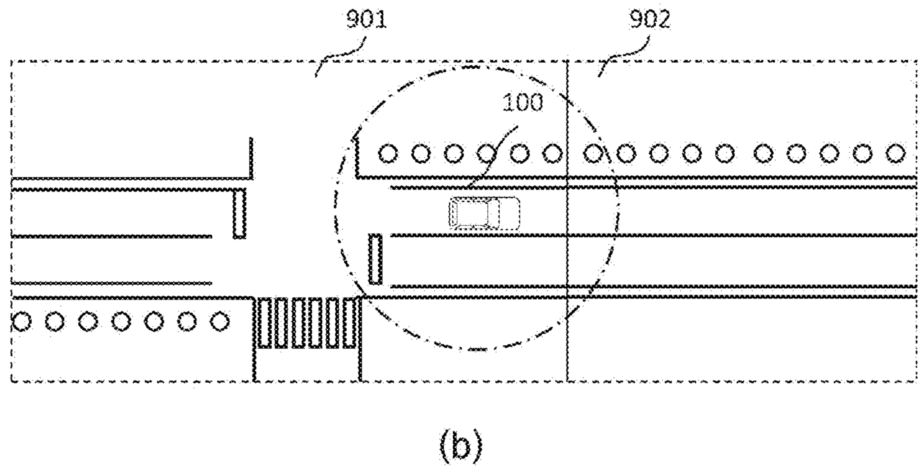
(b)
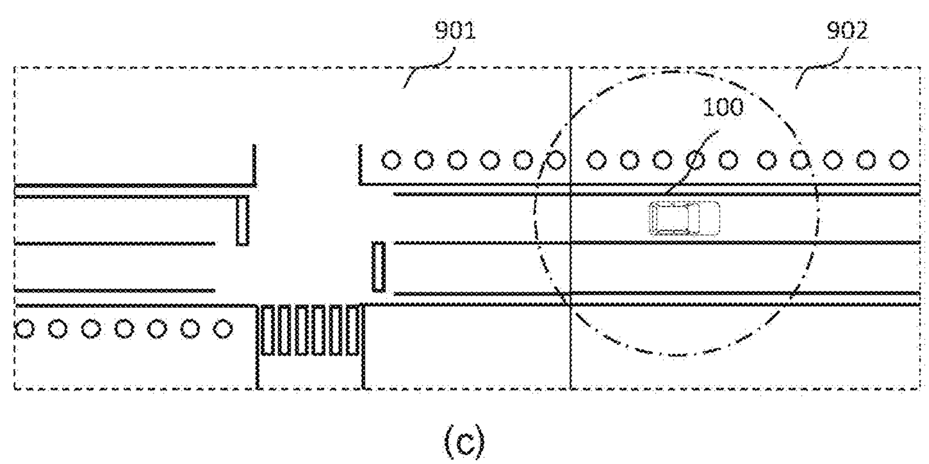
(c)

COMPUTING DEVICE, OWN-POSITION ESTIMATING DEVICE, AND MAP INFORMATION GENERATING METHOD

TECHNICAL FIELD

The present invention relates to a computing device, an own-position estimating device, and a map information generating method.

BACKGROUND ART

In order to expand the application range of an automatic driving system or a driving support system, it is important to acquire information from a map based on own-position estimation. However, for an expressway, a map for the driving support system is prepared, but the preparation of a map for a residential area such as a general road or a neighborhood of a house has not been made. Therefore, there is a demand for a technique capable of self-generating a map and estimating an own-position. PTL 1 discloses a map creating device including: a first acquiring unit which acquires position information of an object existing outside a vehicle from an external sensor mounted on the vehicle, so as to acquire a first movement amount of the vehicle on the basis of the position information of the object; a second acquiring unit which acquires a second movement amount of the vehicle on the basis of odometry information of the vehicle; and a creating unit which creates map information of a place where the vehicle has traveled, on the basis of the position information of the object, the first movement amount, and the second movement amount.

CITATION LIST

Patent Literature

PTL 1: JP 2021-128207 A

SUMMARY OF INVENTION

Technical Problem

In the invention described in PTL 1, a plurality of maps are joined such that position information of the object is matched, but it is difficult to join the plurality of maps with high accuracy without inconsistency. Therefore, in the invention described in PTL 1, it is difficult to maintain the accuracy as the region of the map expands.

Solution to Problem

A computing device according to a first aspect of the present invention includes: a sensor information acquiring unit which acquires sensor information output by a sensor which is mounted on a vehicle and measures a surrounding environment; a storage unit which stores a reference map which is created in advance and is a map of a reference coordinate system which is a predetermined world coordinate system; an odometry information acquiring unit which acquires movement information which is information regarding movement of the vehicle on the basis of an output of the sensor mounted on the vehicle; a periphery map generating unit which generates a periphery map, which is a map in a vehicle coordinate system which is a coordinate system different from the reference coordinate system, on the basis of the sensor information and the movement information; a partial map extracting unit which extracts partial maps, which are regions not overlapping each other, from the periphery map; and a gap parameter calculating unit which calculates, for a coordinate conversion parameter for converting each of the partial maps into a converted partial map which is a map in the reference coordinate system, a gap parameter which is information regarding at least a correlation of the coordinate conversion parameter between the partial maps adjacent to each other, and the partial map extracting unit generates a new partial map when an amount of offset from the reference map is equal to or larger than a predetermined threshold.

An own-position estimating device according to a second aspect of the present invention includes: a storage unit which stores a partial map group which is a set of converted partial maps having different coordinate conversion parameters to be applied; and a gap parameter including at least information regarding a correlation of the coordinate conversion parameters between the converted partial maps adjacent to each other. The coordinate conversion parameter is a parameter for conversion into a first coordinate system adopted by the converted partial map from a second coordinate system different from the first coordinate system, and in any of the converted partial maps, an amount of offset from a reference map which is a map of the first coordinate system created in advance is equal to or less than a predetermined threshold. The own-position estimating device further includes: an own-position estimating unit which specifies a position of a vehicle on the converted partial map on the basis of an output of a sensor mounted on the vehicle; and a continuous map generating unit which corrects relative positions of two converted partial maps adjacent to each other on the basis of the gap parameter regarding the two converted partial maps when the position of the vehicle estimated by the own-position estimating unit approaches a boundary between the two converted partial maps, and generates a continuous map in which the two converted partial maps are continuous.

A map information generating method according to a third aspect of the present invention is a map information generating method executed by a computing device including a sensor information acquiring unit which acquires sensor information output by a sensor which is mounted on a vehicle and measures a surrounding environment, a storage unit which stores a reference map which is created in advance and is a map of a reference coordinate system which is a predetermined world coordinate system, and an odometry information acquiring unit which acquires movement information which is information regarding movement of the vehicle on the basis of an output of the sensor mounted on the vehicle. The method includes: a generating step of generating a periphery map, which is a map in a vehicle coordinate system which is a coordinate system different from the reference coordinate system, on the basis of the sensor information and the movement information; an extracting step of extracting partial maps, which are regions not overlapping each other, from the periphery map; and a calculating step of calculates, for a coordinate conversion parameter for converting each of the partial maps into a converted partial map which is a map in the reference coordinate system, a gap parameter which is information regarding t least a correlation of the coordinate conversion parameter between the partial maps adjacent to each other. The extracting step generates a new partial map when an amount of offset from the reference map is equal to or larger than a predetermined threshold.

Advantageous Effects of Invention

According to the present invention, it is possible to create a map having an error equal to or less than a certain value regardless of a region size.

BRIEF DESCRIPTION OF DRAWINGS

FIG. 5 is a diagram illustrating a relationship among a reference map 181, a periphery map, a partial map, a converted partial map, and a partial map group.

FIG. 8 is a diagram illustrating an example of the periphery map.

FIG. 10 is a diagram illustrating an example of matching between the reference map and the partial map.

FIG. 11 is a diagram illustrating an example of the partial map group.

FIG. 13 is a diagram illustrating an operation of a continuous map generating unit.

DESCRIPTION OF EMBODIMENTS

First Embodiment

Hereinafter, a first embodiment of a vehicle-mounted device which is a computing device and an own-position estimating device according to the present invention will be described with reference to FIGS. 1 to 14.

Figure 1:
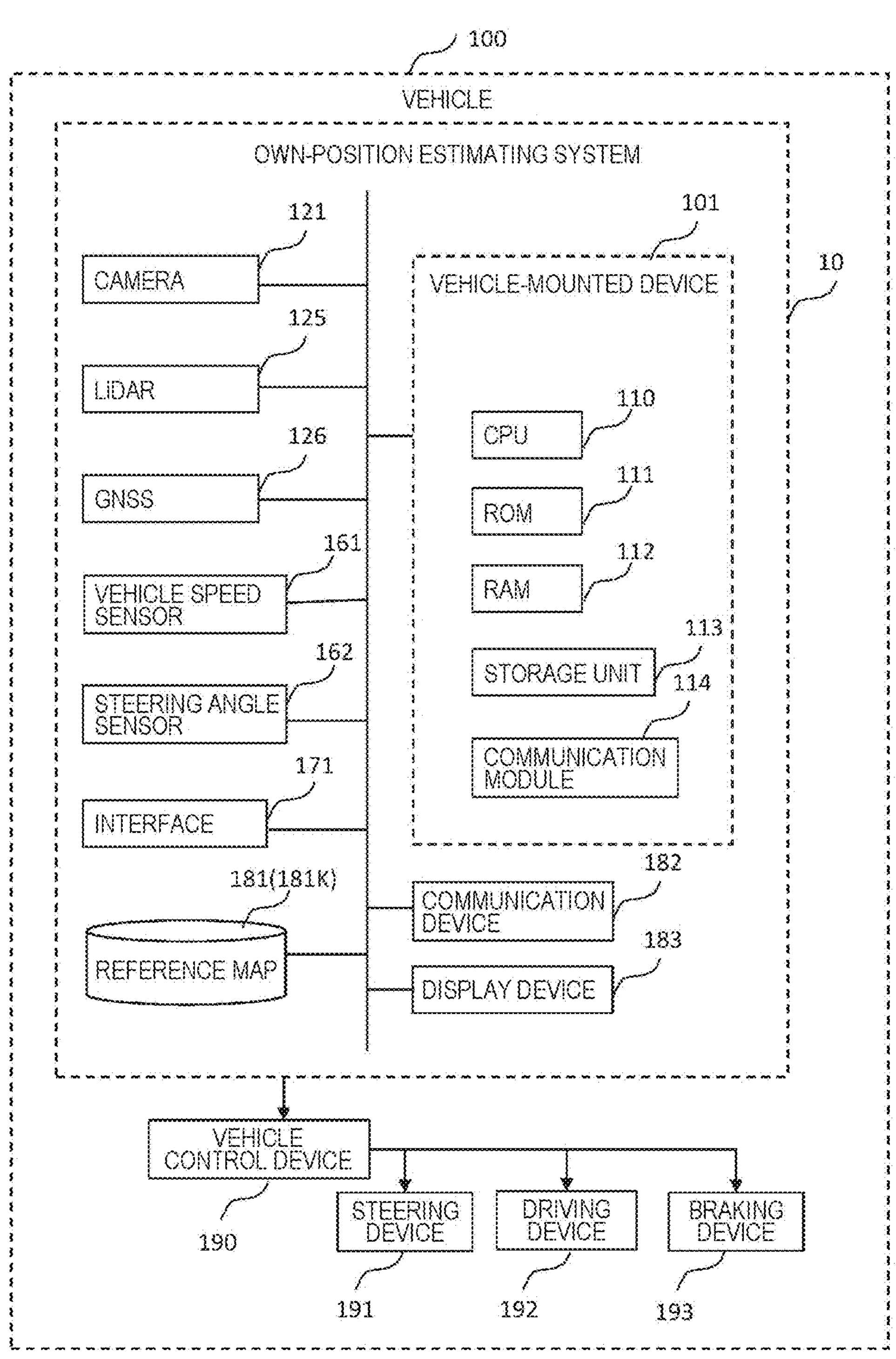
FIG. 1 is a block diagram illustrating a configuration of a vehicle on which a vehicle-mounted device is mounted.

FIG. 1 is a block diagram illustrating a configuration of a vehicle 100 on which a vehicle-mounted device 101 is mounted. The vehicle 100 includes an own-position estimating system 10, a vehicle control device 190, a steering device 191, a driving device 192, and a braking device 193. The own-position estimating system 10 includes a camera 121, a LiDAR 125, a GNSS 126, a vehicle speed sensor 161, a steering angle sensor 162, an interface 171, a reference map storage unit 181K which stores a reference map 181, a vehicle-mounted device 101, a communication device 182, and a display device 183. The vehicle-mounted device 101 acquires various types of data from the camera 121, the LiDAR 125, the GNSS 126, the vehicle speed sensor 161, the steering angle sensor 162, the interface 171, and the reference map 181 connected by signal lines.

The vehicle-mounted device 101 is, for example, an electronic control unit (ECU). The vehicle-mounted device 101 includes a CPU 110, a ROM 111, a RAM 112, a storage unit 113, and a communication module 114. The CPU 110 develops and executes various programs from the ROM 111 into the RAM 112, thereby realizing functions to be described later. However, the vehicle-mounted device 101 may realize the functions to be described later by using a field programmable gate array (FPGA) which is a rewritable logic circuit, or an application specific integrated circuit (ASIC) which is an application specific integrated circuit, instead of a combination of the CPU 110, the ROM 111, and the RAM 112. In addition, instead of the combination of the CPU 110, the ROM 111, and the RAM 112, the vehicle-mounted device 101 may be realized by a combination of different configurations, for example, a combination of the CPU 110, the ROM 111, the RAM 112, and the FPGA.

The RAM 112 is a readable/writable storage area, and operates as a main storage device of the vehicle-mounted device 101. The RAM 112 stores a periphery map 141, a gap parameter 142, and a partial map 143, which are used for developing the programs described above and will be described later. The ROM 111 is a read-only storage area and stores a program to be described later. This program is developed in the RAM 112 and executed by the CPU 110. The CPU 110 is a central processing unit. The storage unit 113 is a nonvolatile storage device, and operates as an auxiliary storage device of the vehicle-mounted device 101. The communication module 114 is a communication module corresponding to a communication standard adopted by the own-position estimating system 10, for example, IEEE 802.3 or CAN (registered trademark). The vehicle-mounted device 101 exchanges information with another device via the communication module 114.

The camera 121 is attached to, for example, the front side of the vehicle interior windshield of the vehicle 100, and captures an image of the front side of the vehicle 100. A positional relationship and a postural relationship between the camera 121 and the vehicle 100 are stored as sensor parameters 140 in the ROM 111 as described later. An attaching method of the camera 121 is not limited to the above-described method, and another attaching method may be used. In addition, a plurality of cameras 121 may be provided in the vehicle 100. The LiDAR 125 is mounted on the vehicle 100 and observes the surroundings of the vehicle 100. The positional and postural relationship between the LiDAR 125 and the vehicle 100 is stored as the sensor parameter 140 in the ROM 111.

The camera 121 includes a lens and an imaging element. Characteristics of the camera, for example, internal parameters such as a lens distortion coefficient which is a parameter indicating lens distortion, an optical axis center, a focal length, the number of pixels and dimensions of the imaging element, and external parameters such as a relationship in position and posture between the vehicle 100 and the camera 121 are stored as the sensor parameters 140 in the ROM 111. Note that the positional and postural relationship between the vehicle 100 and each of the sensors of the camera 121 and the LiDAR 125 may be estimated by the CPU 110 by using the captured image, the vehicle speed sensor 161, and the steering angle sensor 162 in the vehicle-mounted device 101.

The LiDAR 125 is a light detection and ranging (LiDAR) device which performs object detection and distance measurement using light. Information unique to each sensor constituting the LiDAR 125 is stored as the sensor parameter 140 described above in the ROM 111. The GNSS 126 is a receiver constituting a global navigation satellite system (GNSS). The GNSS 126 receives radio waves from a plurality of satellites constituting the GNSS, analyzes signals included in the radio waves to calculate a position of the vehicle 100, that is, a combination of latitude and longitude (hereinafter, referred to as "latitude and longitude"), and outputs the position to the vehicle-mounted device 101.

The vehicle speed sensor 161 and the steering angle sensor 162 measure the vehicle speed and the steering angle of the vehicle 100 on which the vehicle-mounted device 101 is mounted, and output the vehicle speed and the steering angle to the vehicle-mounted device 101. By a known dead reckoning technique using the outputs of the vehicle speed sensor 161 and the steering angle sensor 163, the vehicle-mounted device 101 calculates the movement amount and the movement direction of the vehicle on which the vehicle-mounted device 101 is mounted. The interface 171 is, for example, a GUI which receives an instruction input from a user. In addition, other information may be exchanged in other forms.

The reference map 181 is a map created in advance, for example, a map for a car navigation system. The reference map 181 stores road network information using a node and a link associated with latitude and longitude. The node is a point set corresponding to an intersection, a branch, or the like on a road, and the link is a line connecting two nodes arranged along the road. The reference map 181 includes, for example, information such as a lane center line position, a lane width, the number of lanes, a road boundary position, a stop line position, and a signal position. However, the accuracy thereof conforms to a general map for car navigation, and for example, each feature has an error of about 1σ2 m. Therefore, this map alone is insufficient in accuracy to realize automatic driving and an advanced driving support system (hereinafter, referred to as "AD/ADAS"). As a general tendency, the reference map 181 does not necessarily have high local accuracy, but has stable accuracy similar to the local accuracy even in a wide area.

In the present embodiment, in order to simplify the description, the reference map 181 adopts a plane orthogonal coordinate system. However, if complexity of calculation is allowed, the reference map 181 may adopt a latitude-longitude coordinate system. The coordinate system adopted by the reference map 181 is referred to as a "reference coordinate system" or a "first coordinate system". For example, in the reference coordinate system, a predetermined latitude and longitude point is defined as an origin, a north direction is defined as an X axis, an east direction is defined as a Y axis, and a gravity direction is defined as a Z axis.

The communication device 182 is used for wirelessly exchanging information between a device outside the vehicle 100 and the vehicle-mounted device 101. For example, when the user is outside the vehicle 100, information is exchanged by communicating with a mobile terminal worn by the user. The target with which the communication device 182 communicates is not limited to the mobile terminal of the user. The display device 183 is, for example, a liquid crystal display, and displays the information output from the vehicle-mounted device 101.

The vehicle control device 190 controls the steering device 191, the driving device 192, and the braking device 193 on the basis of the own-position of the vehicle 100 output from the vehicle-mounted device 101. The steering device 191 operates the steering of the vehicle 100. The driving device 192 applies a driving force to the vehicle 100. For example, the driving device 192 increases the driving force of the vehicle 100 by increasing the target rotation speed of the engine included in the vehicle 100. The braking device 193 applies a braking force to the vehicle 100.

Figure 2:
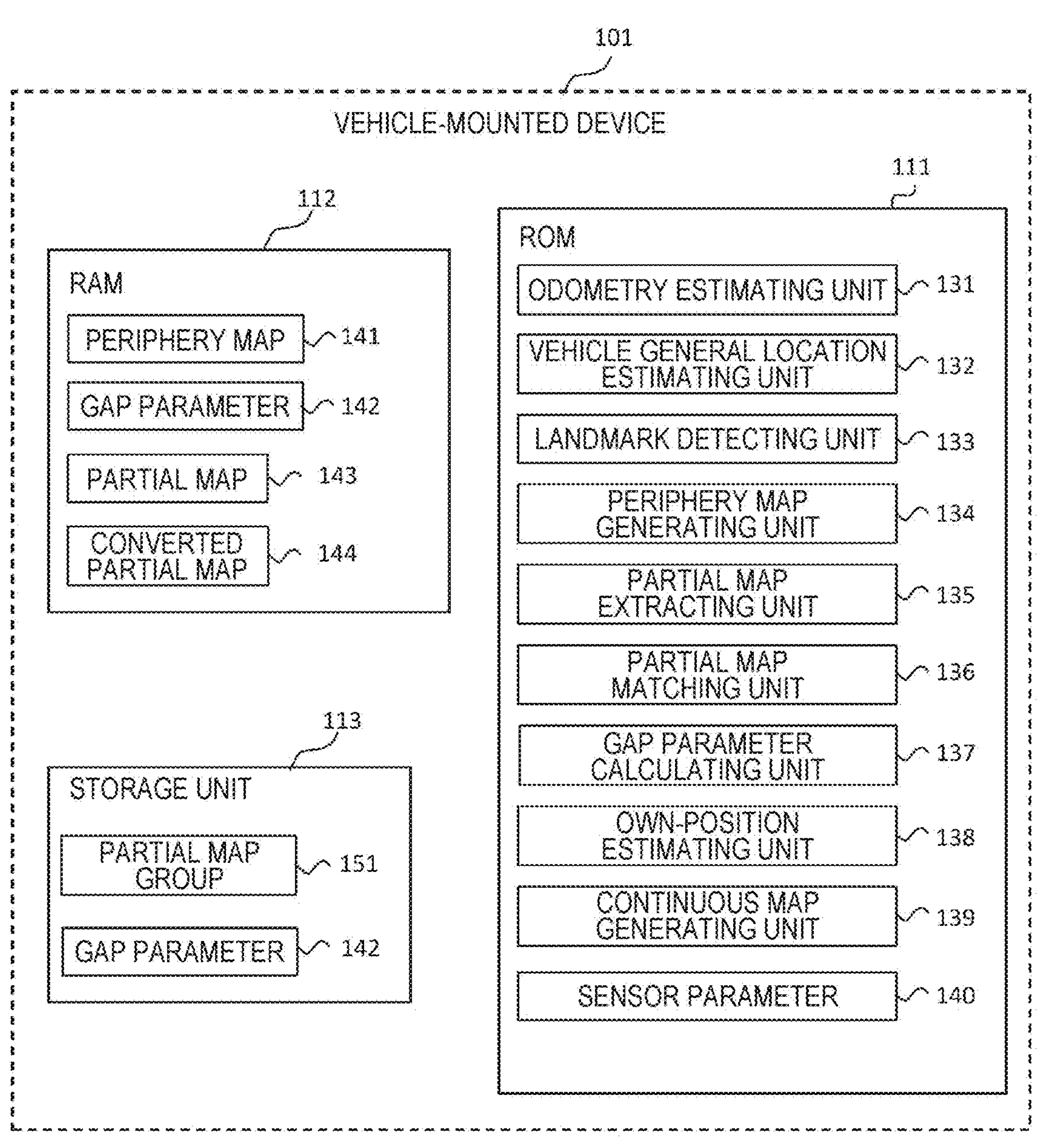
FIG. 2 is a functional configuration diagram of the vehicle-mounted device.

FIG. 2 is a functional configuration diagram of the vehicle-mounted device 101. The CPU 110 reads and executes the program to operate as an odometry estimating unit 131, a vehicle general location estimating unit 132, a landmark detecting unit 133, a periphery map generating unit 134, a partial map extracting unit 135, a partial map matching unit 136, a gap parameter calculating unit 137, an own-position estimating unit 138, and a continuous map generating unit 139. The RAM 112 stores the periphery map 141, the gap parameter 142, the partial map 143, and a converted partial map 144. The storage unit 113 stores a partial map group 151 and the gap parameter 142.

The periphery map 141, the gap parameter 142, the partial map 143, the converted partial map 144, and the partial map group 151 are created by a procedure to be described later. Hereinafter, the operation of the vehicle-mounted device 101 will be described by being divided into a "creation phase" and a "use phase" for convenience. The partial map group 151 and the gap parameter 142 are created in the creation phase and stored in the storage unit 113, and are read from the storage unit 113 and used in the use phase. Details of the creation phase and the use phase will be described later.

The ROM 111 further stores the sensor parameters 140. The sensor parameter 140 stores a positional and postural relationship between each of each of the camera 121, the LIDAR 125, and the GNSS 126, and the vehicle 100, and information unique to each sensor. Regarding the camera 121, a lens distortion coefficient, an optical axis center, a focal length, and the number of pixels and dimensions of the imaging element, and also in the case of other external sensors, unique information corresponding to each sensor are stored.

Figure 3:
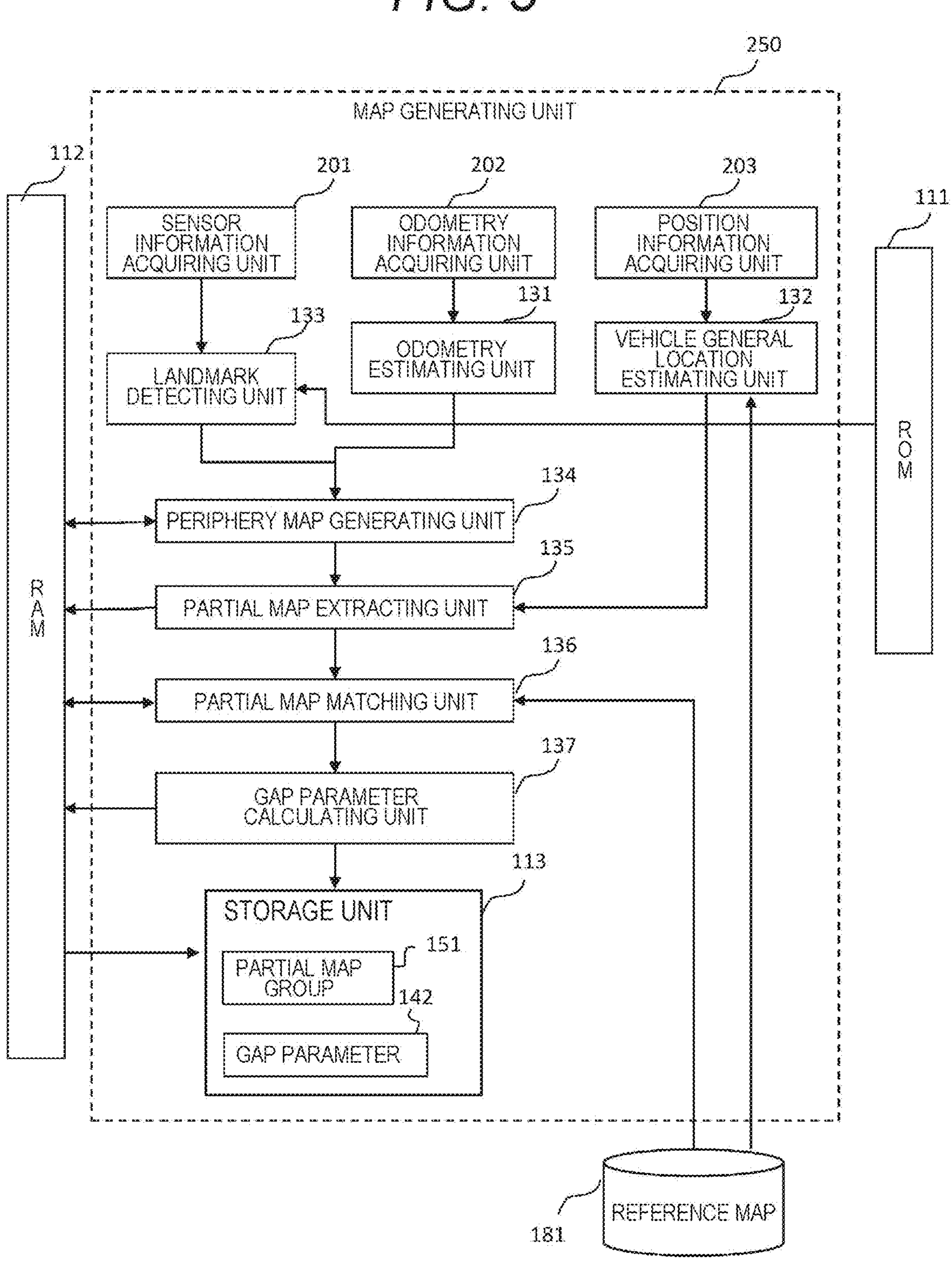
FIG. 3 is a diagram illustrating an outline of processing of the vehicle-mounted device in a creation phase.

FIG. 3 is a diagram illustrating an outline of processing of the vehicle-mounted device 101 in the creation phase. Hereinafter, the sensor information acquiring unit 201, the odometry information acquiring unit 202, the position information acquiring unit 203, the landmark detecting unit 133, the odometry estimating unit 131, the vehicle general location estimating unit 132, the periphery map generating unit 134, the partial map matching unit 136, and the gap parameter calculating unit 137 illustrated in FIG. 3 are also collectively referred to as a "map generating unit" 250. The processing illustrated in FIG. 3 is repeatedly executed while the vehicle 100 is traveling. Hereinafter, one period of the processing repeatedly executed and illustrated in FIG. 3 is referred to as a "processing cycle".

The map generating unit 250 generates a map, which can also be used for AD/ADAS, by using sensing information by the camera 121 and the LiDAR 125, which are sensors mounted on an own vehicle, and the information of the reference map 181. The map generating unit 250 self-generates a map by combining sensor information observed at each time in time series in consideration of vehicle movement. The map generating unit 250 superposes the generated map and the information of the reference map 181 by using the partial map matching unit 136 and the gap parameter calculating unit 137, so as to allow for reference to both pieces of information, thereby further generating a map for AD/ADAS. That is, the map generating unit 250 generates a map for AD/ADAS that can refer to both the sensing information and the information of the reference map 181 by using the information obtained by the vehicle 100 traveling once. The processing of each configuration illustrated in FIG. 3 is as follows.

The sensor information acquiring unit 201 acquires a signal output from each external sensor. Specifically, the sensor information acquiring unit 201 acquires image information from the camera 121, and acquires point group coordinates and reflection intensity from the LiDAR 125. The camera 121 performs photographing continuously at a high frequency, for example, 30 times per second. The LiDAR 125 receives a signal at a constant frequency for each sensor. The sensor information acquiring unit 201 receives these images and signals at a high frequency, for example, every 33 milliseconds, and outputs the images and signals to the landmark detecting unit 133.

The odometry information acquiring unit 202 acquires signals such as a speed and a steering angle regarding odometry estimation output from the vehicle speed sensor 161 and the steering angle sensor 162. The odometry information acquiring unit 202 continuously receives the signals at a high frequency and outputs the signals to the odometry estimating unit 131. The position information acquiring unit 203 acquires s latitude and longitude information indicating the current position of the vehicle 100 output from the GNSS 126. The position information acquiring unit 203 outputs the information to the vehicle general location estimating unit 132 every time the information is acquired.

The landmark detecting unit 133 detects a landmark by using the output of the sensor information acquiring unit 201 and the sensor parameter 140 stored in the ROM 111. The landmark is a feature having a feature identifiable by a sensor, and is, for example, a lane mark which is a type of road marking paint, a stop line, a crosswalk, another regulation display, a road boundary not represented by a lane mark, a curbstone, a guardrail, a building wall, a traffic signal, or the like. In the present embodiment, a vehicle or a human which is a moving object is not included in the landmark.

First, the landmark detecting unit 133 recognizes a landmark on a road surface present around the vehicle 100, that is, a feature on the road surface having a feature identifiable by a sensor, on the basis of information input from the camera 121 and the LiDAR 125. As a recognition means, various known methods can be used. For example, the landmark can be detected by using a parameter obtained by preliminary learning and a neural network that realizes a known classifier. The landmark information may be obtained in units of pixels or may be obtained by being grouped as an object. The landmarks need to be identified by recognition as any of identified specific objects, for example, a lane mark, a crosswalk, and a stop line.

Next, the landmark detecting unit 133 generates a point group expressing the landmarks on the basis of the landmark information obtained here. This point group may be two-dimensional or three-dimensional. In a case where the landmark detecting unit 133 uses an image captured and obtained by the camera 121, for a coordinate value on the road surface, a distance on the road surface can be obtained by using the information regarding the camera 121 included in the sensor parameter 140, and the coordinate value on the road surface can be calculated from the distance information on the road surface. The calculation of coordinate values outside the road surface can be realized by a known Visual Simultaneous Localization and Mapping (VSLAM) technique. Using this, the landmark detecting unit 133 outputs, as the point group, the corresponding two-dimensional coordinates to the periphery map generating unit 134 for the pixel in which the landmark exists or the grouped target.

In a case where the output of the LiDAR 125 is used, the landmark detecting unit 133 includes the point group in the output from the characteristics of the sensor included in the LiDAR 125, and performs recognition processing by using the point group, so that the point group information associated with the landmark can be obtained without special processing. In addition, the coordinates of each landmark calculated by the landmark detecting unit 133 are observation values in each sensor coordinate system, and are relative coordinate values from the sensor. In addition, although a recognition label cannot be assigned as a landmark, information that can be acquired as a point group is also output as a landmark to the periphery map generating unit 134. This point group is not directly used for AD/ADAS, but is used as a feature for own-position estimation in the own-position estimating unit 138 described later.

The odometry estimating unit 131 estimates vehicle movement by using the speed and the steering angle of the vehicle input from the vehicle speed sensor 161 and the steering angle sensor 162 and transmitted from the odometry information acquiring unit 202. For example, the odometry estimating unit 131 may use known dead reckoning or may be used in combination with a known Kalman filter or the like. In addition, the odometry estimating unit 131 may also acquire camera information from the sensor information acquiring unit 201, and estimate the vehicle movement by using a known visual odometry technique using an image. The vehicle speed, the steering angle, the vehicle movement information, and the vehicle movement trajectory obtained by integrating the vehicle movement obtained here are output to the periphery map generating unit 134 and the vehicle general location estimating unit 132. Note that the odometry estimating unit 131 may also receive information of the GNSS acquired by the position information acquiring unit 203, and output, as odometry, information estimated from the vehicle speed, the steering angle, and the GNSS. In addition, the output of the odometry estimating unit 131 is not necessarily accurate, and for example, there is a tendency for errors to accumulate with the lapse of time.

The vehicle general location estimating unit 132 estimates the general location of the vehicle 100 on the reference map 181 by using the position information of the vehicle input from the GNSS 126 and transmitted from the position information acquiring unit 203, information of nodes and links included in the reference map 181, and odometry information obtained from the odometry estimating unit 131. The general location is estimated by, for example, a map matching technique known in a car navigation system or the like. The map matching technique estimates a position at a road level, for example, specification of a road on which the vehicle is traveling, and an approximate distance from an intersection, from the trajectory information obtained from the GNSS 126 and the odometry estimating unit 131 and the road shape information represented by nodes and links. Due to the position on the road level, an error of about several meters is included in the front-rear direction and the left-right direction of the vehicle.

The periphery map generating unit 134 converts the point group or the vector information, which is the relative coordinate value from the sensor obtained from the landmark detecting unit 133, into the world coordinates of the plane orthogonal coordinate system by using the movement information of the own vehicle obtained from the odometry estimating unit 131 and the sensor parameter 140 indicating the attaching position of the sensor or the like stored in the ROM 111, and generates the periphery map 141 by combining the converted point group or vector information in time series. The world coordinate value is a coordinate value based on a certain coordinate and a certain axis. For example, a position at which the vehicle-mounted device 101 is started is defined as an origin, a direction immediately proceeding the origin is defined as an X axis, and an axis orthogonal to the X axis is defined as a Y axis or a Z axis. Hereinafter, the coordinate system adopted by the periphery map generating unit 134 is referred to as a "vehicle measurement coordinate system" or a "second coordinate system". The map obtained here is stored as the periphery map 141 in the RAM 112. After the next time, the periphery map 141 is read from the RAM 112, the point group or the vector information newly obtained from the landmark detecting unit 133 is coordinate-converted, and combined in time series by using the movement information of the own vehicle.

The partial map extracting unit 135 extracts a part of the periphery map 141 as the partial map 143. Specifically, the partial map extracting unit 135 extracts, as the partial map 143, a part of the periphery map 141 including map information around the current position of the vehicle 100 by using the periphery map 141 generated by the periphery map generating unit 134, the schematic position on the reference map 181 calculated by the vehicle general location estimating unit 132, and the reference map 181. Details will be described later. Note that, since the periphery map 141 is generated by using the output of the odometry estimating unit 131, accumulation of errors is likely to occur, and accuracy is locally high, but accuracy is not necessarily high in a wide area. For example, the accuracy of the periphery map 141 is locally higher than that of the reference map 181, but the accuracy of the reference map 181 is higher than that of the periphery map 141 in a wide area.

The partial map extracting unit 135 first determines whether or not it is necessary to cut out the partial map 143, and then cuts out the partial map 143 when it is necessary to cut out the partial map 143. As a result, the partial map matching unit 136 and the gap parameter calculating unit 137 in the subsequent stage operate. In a case where it is not necessary to cut out the partial map 143, the subsequent processing is omitted.

Before describing determination as to whether or not it is necessary to cut out the partial map 143, exception processing will be described. In a case where the processing by the partial map matching unit 136 at the subsequent stage has never been executed, the periphery map 141 itself is output as the partial map 143 to the RAM 112 without determining whether or not it is necessary to cut out the partial map 143, and is passed to the partial map matching unit 136. When the processing by the partial map matching unit 136 is executed at least once, it is determined whether or not it is necessary to cut out the partial map 143 as follows.

Whether or not it is necessary to cut out the partial map 143 is determined by whether or not an error in superposition of roads between the reference map 181 and the partial map 143 is larger than a predetermined value (hereinafter, referred to as an "allowable error"). The error in superposition of roads is evaluated by, for example, a difference between lane center lines. When the error in superposition of roads exceeds the allowable error, the partial map extracting unit 135 determines that it is necessary to cut out the partial map 143 and extracts the partial map 143. The extraction range of the partial map 143 is a range which is a difference between the range previously cut out as the partial map 143 in the periphery map 141 and the current periphery map 141. The extracted partial map 143 is recorded in the RAM 112.

The partial map matching unit 136 converts the partial map 143 of the vehicle measurement coordinate system into the converted partial map 144 of the reference coordinate system. Comparing the vehicle measurement coordinate system adopted by the periphery map 141 with the reference coordinate system adopted by the reference map 181, the origin and the direction of each axis are not the same. However, since both adopt the plane orthogonal coordinate system, the position and posture of a certain object in the vehicle measurement coordinate system can be converted into the reference coordinate system by translational movement and rotation. That is, the coordinate conversion can be expressed by three parameters of x and y indicating a translational movement amount and θ indicating a rotation amount. Note that it is not essential that both the vehicle measurement coordinate system and the reference coordinate system adopt the plane orthogonal coordinate system. In that case, a calculation formula becomes complicated as compared with a case where both are the plane orthogonal coordinate system, and the number of parameters may be four or more. However, in any case, conversion can be performed by a known calculation formula and parameters for coordinate conversion (hereinafter, referred to as a "coordinate conversion parameter" or a "conversion parameter"), and thus no particular problem occurs.

The partial map matching unit 136 matches position information of a feature common to the partial map 143, which is extracted by the partial map extracting unit 135 and recorded in the RAM 112, and the reference map 181, that is, position information such as a lane mark, a stop line, a crosswalk, a road boundary not represented by a lane mark, and a traffic signal, thereby obtaining a position of the partial map 143 to be superposed on the reference map 181, and converts the coordinates of the partial map 143 into the coordinates on the reference map 181. In the matching of the position information of the feature, for example, the vector information is also converted into a point group, and a matching position which minimizes an error between corresponding points can be obtained by utilizing ICP which is a known matching technique between point groups. However, the partial map matching unit 136 may utilize other matching methods. Here, it is desirable that the matching can be performed as accurately as possible.

However, since the information of the feature of the reference map 181 is originally less accurate than the actual observation value, the feature information of the partial map 143 generated from the actual observation value and the feature information of the reference map 181 cannot be completely matched with each other, and thus a slight error cannot be avoided. This error is presented as an error as it is in a case where the own-position estimation is performed by the position estimating unit 350 described later, and road network information or the like of the reference map 181 is referred to. The range which can be handled by AD/ADAS changes according to the substantial error amount. By this matching, conversion parameters for converting the partial map 143 into coordinates on the reference map 181, that is, the above-described x, y, and 0 can be obtained.

The partial map matching unit 136 converts the coordinates of the partial map 143 by using the conversion parameters obtained here, and records the result as the converted partial map 144 in the RAM 112. The partial map 143 is generated every time this processing is performed, and a plurality of partial maps are held with being aligned with the partial maps generated up to the previous processing. Further, the partial map matching unit 136 outputs the obtained conversion parameters, for example, x, y, and θ, to the gap parameter calculating unit 137. However, since accumulation of errors is inevitable in the position information calculated by the odometry estimating unit 131, this conversion parameter changes with the lapse of time.

The gap parameter calculating unit 137 calculates the gap parameter 142 for correcting an amount of offset between the converted partial maps 144 by using the conversion parameter obtained by the partial map matching unit 136. The conversion parameter obtained by the partial map matching unit 136 in the previous stage is a parameter for converting the vehicle measurement coordinate system used by the periphery map generating unit 134 into the reference coordinate system used by the reference map 181. The gap parameter calculating unit 137 can express the gap parameter 142 for correcting the amount of offset between the new converted partial map 144 and the previously created converted partial map 144 by the product of the inverse matrix of the conversion matrix based on the latest conversion parameter and the conversion matrix based on the previously calculated conversion parameter. However, depending on the expressing method of the conversion parameter, this may not apply. The obtained gap parameter 142 is stored in the storage unit 113 as a set along with together with the partial map group 152, which is a set of the converted partial maps 144 stored in the RAM 112.

Figure 4:
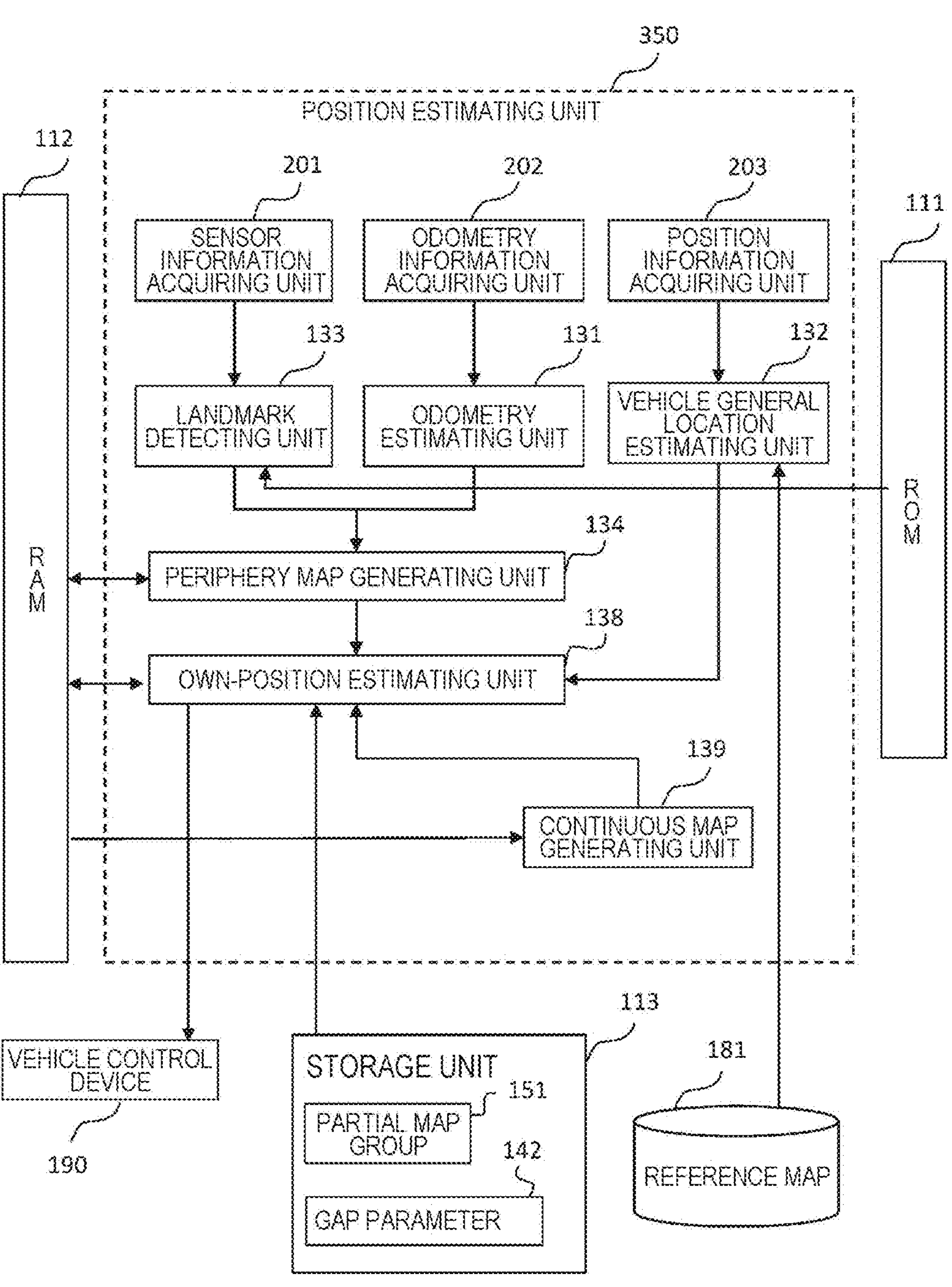
FIG. 4 is a diagram illustrating an outline of processing of the vehicle-mounted device in a use phase.

FIG. 4 is a diagram illustrating an outline of processing of the vehicle-mounted device 101 in the use phase. Hereinafter, the sensor information acquiring unit 201, the odometry information acquiring unit 202, the position information acquiring unit 203, the landmark detecting unit 133, the odometry estimating unit 131, the vehicle general location estimating unit 132, the periphery map generating unit 134, the own-position estimating unit 138, and the continuous map generating unit 139 illustrated in FIG. 4 are also collectively referred to as a "own-position estimating unit" 350. The position estimating unit 350 reads the partial map group 151 and the gap parameter 142 stored in the storage unit 113, and estimates the own-position on the partial map group 151 superposed on the reference map 181 and having the same coordinate system.

The processing executed by the position estimating unit 350 is similar to that of the map generating unit 250 in that the periphery map 141 is self-generated by combining sensor information observed at each time in time series while in consideration of vehicle movement. The processing executed by the position estimating unit 350 is different from that of the map generating unit 250 in that the position estimation in the reference coordinate system is performed by using the periphery map 141, the partial map group 151, and the gap parameter 142. The position estimating unit 350 seamlessly connects offset portions between the converted partial maps 144 included in the partial map group 151 by using the information of the gap parameter 142, as necessary when performing the position estimation. Then, the position estimating unit 350 performs the position estimation on the reference coordinate system by matching the feature information of the maps with each other.

Similarly, when referring the feature information for AD/ADAS, the position estimating unit 350 seamlessly connects the offset portions of the partial map group 151, thereby enabling highly accurate feature reference, and further enabling the information of the reference map 181. Since the operations of the sensor information acquiring unit 201, the odometry information acquiring unit 202, the position information acquiring unit 203, the landmark detecting unit 133, the odometry estimating unit 131, the vehicle general location estimating unit 132, and the periphery map generating unit 134 are common to those of the map generating unit 250, the continuous map generating unit 139 and the own-position estimating unit 138 which are not included in the map generating unit 250 will be described.

The continuous map generating unit 139 generates a continuous map 145. Generation of the continuous map 145 by the continuous map generating unit 139 is classified into two cases. A first case is a case where the continuous map 145 is generated by connecting the plurality of converted partial maps 144 included in the partial map group 151. Specifically, the partial map group 151 and the gap parameter 142 stored in the storage unit 113 and the own-position information on the reference coordinate system calculated by the own-position estimating unit 138 to be described later and stored in the RAM 112 are used to seamlessly connect the partial map group 151. A second case is a case where any of the converted partial maps 144 included in the partial map group 151 is used as the continuous map 145 as it is. In the second case, no special processing is performed, and although there is a discrepancy between the name and the actual state, it is conveniently referred to as the continuous map 145 having the same name. Details are as follows.

The continuous map generating unit 139 first reads the own-position information expressed in the reference coordinate system from the RAM 112, and extracts the converted partial map 144 including the position from the partial map group 151. Next, the continuous map generating unit 139 determines whether or not the converted partial map 144 needs to be connected to another converted partial map 144. This determination is made on the basis of a relationship among the range obtained by the AD/ADAS to be used, the range required by the own-position estimating unit 138, and the range included in the converted partial map 144. However, in a case where it is difficult to make an accurate determination, first, the connection of the converted partial maps 144 may not be performed or a small number of connections may be performed, and when it becomes clear that the range is insufficient in the subsequent processing, the number of connections of the converted partial maps 144 may be increased.

For example, in a case where when an application that realizes the AD/ADAS obtains map information up to 50 m ahead, a range including the map information up to 50 m ahead is connected. In addition, in a case where the own-position estimating unit 138 to be described later performs computation of the own-position estimation, the position estimation is performed by matching between features. However, in a case where the range of the map is narrow, it may be difficult to perform the position estimation by matching between features, and a minimum distance on the map necessary for matching may be defined. In a case where the distance is less than the distance defined by the own-position estimating unit 138, connection is made to another converted partial map 144 to form the continuous map 145, so as to include the position of the own vehicle and secure a necessary length in each of the front and the rear. The connection between the converted partial maps 144 is realized by performing parameter conversion by using the gap parameter 142. The map generated here and connected in the necessary range is passed to the own-position estimating unit 138.

The own-position estimating unit 138 performs own-position estimation on the continuous map 145 generated by the continuous map generating unit 139. The own-position estimation by the own-position estimating unit 138 is performed by matching features between the continuous map 145 and the periphery map 141 generated by the periphery map generating unit 134 during the current travel. As for the features here, unlike matching with the reference map 181, matching is performed including features such as point group information of buildings which the reference map 181 does not have. For example, an iterative closest point (ICP) algorithm which is a known point group matching technique can be used for the matching. As a result, it is possible to obtain the coordinate conversion amount from the periphery map 141 currently traveling to the partial map group 151 generated in the past, and it is possible to estimate the own-position on the partial map group 151 from the position of the current vehicle on the periphery map 141 subjected to the coordinate conversion. Since the partial map group 151 is associated with the reference map 181, a position on the reference map 181 can also be specified.

For features to be referred to by AD/ADAS, optimal features are referred to for both the partial map group 151 and the reference map 181. The reference map 181 includes information, which is difficult to sense, such as a road network or a traffic rule, but the accuracy of features such as a lane mark position is low. On the other hand, the partial map group generated based on the sensing information can have a lane position or the like with high accuracy by sensing, but it is difficult to provide a road network, a traffic rule, or the like which is difficult to sense. Therefore, for example, for features, which are included in a partial map group that can be sensed, such as a lane mark position, the information of the partial map group is referred to, and for road network information or the like, the information of the reference map 181 is referred to.

FIG. 5 is a diagram illustrating a relationship among the reference map 181, the periphery map 141, the partial map 143, the converted partial map 144, and the partial map group 151. However, in the upper part of FIG. 5, an unconfirmed region UP and an unconfirmed converted partial map UQ described in FIG. 6 below are also illustrated. The periphery map 141 created by using the sensor information obtained by traveling of the vehicle 100 includes a plurality of partial maps 143. As described above, the periphery map 141 and the partial map 143 use the vehicle measurement coordinate system. Here, three partial maps P1, P2, and P3 are illustrated. The converted partial maps 144 corresponding to the respective partial maps 143 are indicated by Q1, Q2, and Q3.

As described above, the partial map matching unit 136 calculates a coordinate conversion parameter φ, which is a parameter for coordinate conversion by matching a feature on the reference map 181 for each partial map 143, and converts the partial map 143 into the converted partial map 144. Hereinafter, this coordinate conversion is expressed as "f(φ)" by using a function f and the coordinate conversion parameter φ.

The output of the odometry estimating unit 131 is not necessarily accurate, and for example, errors accumulate with the lapse of time, so that the coordinate conversion parameter φ differs for each partial map 143. Therefore, in FIG. 5, the coordinate conversion parameter φ is different from φ1, φ2, and φ3 for each partial map. That is, the partial map P1 is converted into the converted partial map Q1 by using the coordinate conversion parameter φ1, the partial map P2 is converted into the converted partial map Q2 by using the coordinate conversion parameter φ2, and the partial map P3 is converted into the converted partial map Q3 by using the coordinate conversion parameter φ3.

When the partial map 143 is created first with P1 in the order of P1, P2, and P3, the gap parameter calculating unit 137 calculates "$f(\varphi 2)^T*f(\varphi 1)$" as the gap parameter 142 of the converted partial map Q2. This computation is a product of an inverse matrix of a conversion matrix based on the latest conversion parameter and a conversion matrix based on the conversion parameter calculated immediately before. Q2 which is the converted partial map 144 is stored in the storage unit 113 in association with the gap parameter 142 of "$f(\varphi 2)^T*f(\varphi 1)$". Similarly, Q3 which is the converted partial map 144 is stored in the storage unit 113 in association with the gap parameter 142 of "$f(\varphi 3)^T*f(\varphi 2)$".

Figure 6:
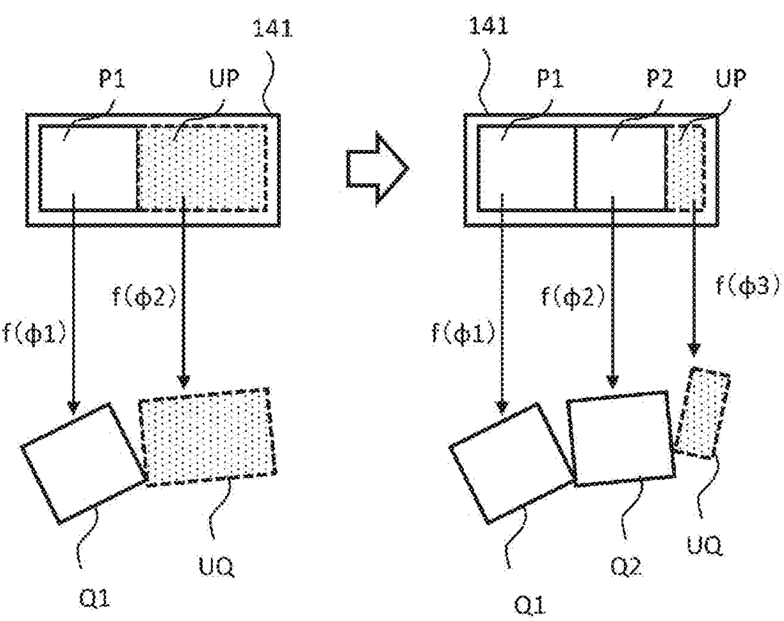
FIG. 6 is a diagram illustrating description of an unconfirmed region and an unconfirmed converted partial map.

FIG. 6 is a diagram illustrating description of the unconfirmed region UP and the unconfirmed converted partial map UQ. The upper part of FIG. 6 illustrates the periphery map 141 of the vehicle measurement coordinate system, and the lower part illustrates the partial map group 151 of the reference coordinate system. In addition, when the processing proceeds from the state of the left half of FIG. 6, the state of the right half of the drawing is obtained. The periphery map 141 is divided into a region of the partial map 143 and an unconfirmed region UP which is a region other than the partial map 143. The region of the partial map 143 can also be referred to as a "confirmed region" since the region is confirmed as compared with the unconfirmed region UP. A region obtained by coordinate-converting the unconfirmed region UP, which is the vehicle measurement coordinate system, into the reference coordinate system is referred to the unconfirmed converted partial map UQ.

The partial map group 151 is the union of one or more converted partial maps 144 and the unconfirmed converted partial map UQ. However, the partial map group 151 may not include the unconfirmed converted partial map UQ. The coordinate conversion parameter used to calculate the unconfirmed converted partial map UQ is the latest coordinate conversion parameter. For example, in a case where the latest coordinate conversion parameter is "φ2" in the state on the left side in the drawing, the unconfirmed converted partial map UQ is calculated by using "φ2". Since a part of the unconfirmed converted partial map UQ becomes the converted partial map 144, the unconfirmed converted partial map UQ can also be referred to as the unconfirmed region of the partial map group 151.

An offset of the unconfirmed converted partial map UQ from the reference map 181 is calculated by the partial map extracting unit 135, and when the offset is less than a predetermined threshold for the entire region of the UQ, no special processing is performed, and the process proceeds to the next processing cycle. When the offset of at least a part of the unconfirmed converted partial map UQ is equal to or more than the predetermined threshold, the partial map extracting unit 135 sets, as a new partial map P2, the unconfirmed region UP corresponding to the unconfirmed converted partial map UQ with the offset less than the predetermined value. Therefore, as illustrated in the upper right of the drawing, the unconfirmed region UP is reduced. In addition, the converted partial map Q2 corresponding to the new partial map P2 is a new confirmed region of the partial map group 151.

The partial map matching unit 136 performs matching processing on the reduced unconfirmed region UP with the reference map 181, and calculates a new coordinate conversion parameter φ3. In the next processing cycle, the coordinate conversion of the unconfirmed region UP is performed by using the coordinate conversion parameter φ3. The above is the description of FIG. 6.

Figure 7:
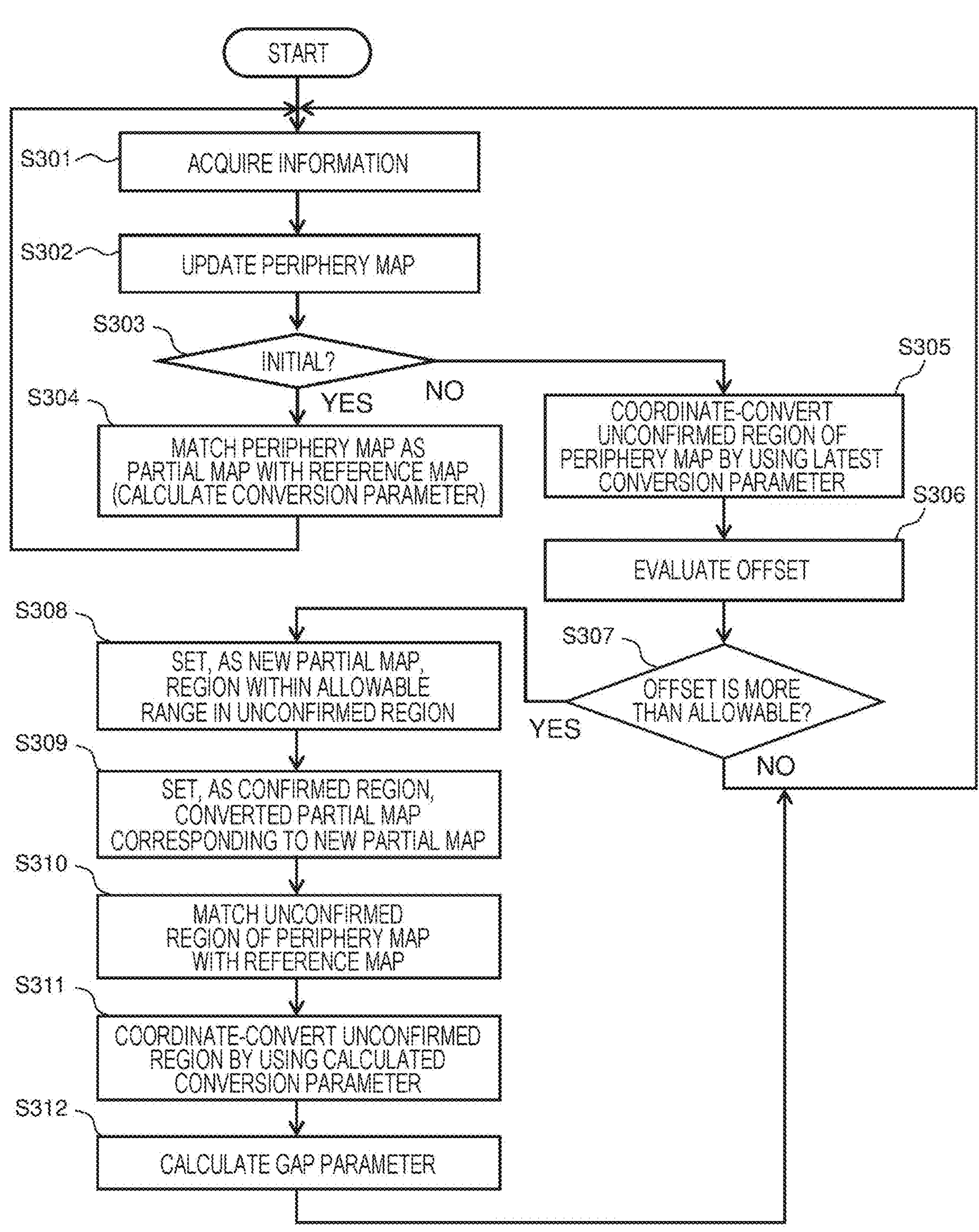
FIG. 7 is a flowchart illustrating processing by a map generating unit.

FIG. 7 is a flowchart illustrating processing by the map generating unit 250. However, this flowchart mainly describes processing after the periphery map generating unit 134. The map generating unit 250 first acquires various types of information in step S301. The processing of step S301 corresponds to the processing of the sensor information acquiring unit 201, the odometry information acquiring unit 202, the position information acquiring unit 203, the landmark detecting unit 133, the odometry estimating unit 131, and the vehicle general location estimating unit 132 described in the upper part of FIG. 3.

In subsequent step S302, the periphery map generating unit 134 updates the periphery map 141. However, since the periphery map 141 does not exist at the time of initial execution, the periphery map generating unit 134 creates the periphery map 141. In subsequent step S303, the partial map extracting unit 135 determines whether or not it is initial execution, that is, whether or not it is immediately after the creation of the periphery map 141 is started. The partial map extracting unit 135 proceeds to step S304 if determining that it is initial, and proceeds to step S305 if determining that it is not initial.

In step S304, the partial map matching unit 136 outputs, as the first partial map 143, the periphery map 141 created in step S302 to the partial map matching unit 136, and the partial map matching unit 136 performs matching with the reference map 181, calculates the conversion parameter corresponding to the first partial map 143, and returns to step S301. Note that in step S304, the first partial map is subjected to coordinate conversion by using the calculated conversion parameter, to be set as the confirmed region of the converted partial map 144.

In step S305, the partial map matching unit 136 coordinate-converts the unconfirmed region of the periphery map 141 into the reference coordinate system by using the latest conversion parameter. In subsequent step S306, the partial map matching unit 136 evaluates an offset between the unconfirmed region of the periphery map 141 coordinate-converted into the reference coordinate system in step S305 and the reference map 181. For example, as described above, a difference between the lane center lines of both can be used to evaluate the offset. In subsequent step S307, the partial map extracting unit 135 determines whether or not the evaluation result of the offset executed in step S306 is an allowable value or more. The partial map extracting unit 135 proceeds to step S308 if determining that the offset is equal to or more than the allowable value, and returns to step S301 if determining that the offset is less than the allowable value.

In step S308, the partial map extracting unit 135 sets, as a new partial map, a region having an offset within an allowable range in the unconfirmed region. That is, by executing step S308, the unconfirmed region of the periphery map 141 is reduced. In subsequent step S309, the partial map matching unit 136 sets, as the confirmed region of the converted partial map 144, the region of the converted partial map 144 corresponding to the region newly set as the partial map in step S308. In other words, a part of the region of the reference coordinate system obtained by the coordinate conversion in step S305 is set as a new confirmed region of the converted partial map 144.

In subsequent step S310, the partial map matching unit 136 performs matching processing between the unconfirmed region of the periphery map 141, that is, the remaining unconfirmed region which has not been set as the new partial map by the processing in step S308, and the reference map 181, and calculates a new coordinate conversion parameter. In subsequent step S311, the partial map matching unit 136 coordinate-converts the unconfirmed region by using the coordinate conversion parameter calculated in step S310 to obtain a new unconfirmed converted partial map. In subsequent step S312, the gap parameter calculating unit 137 calculates a gap parameter by using the latest coordinate conversion parameter and the previous coordinate conversion parameter, and returns to step S301. Note that the latest coordinate conversion parameter in step S312 is the coordinate conversion parameter calculated in step S311. The above is the description of FIG. 7.

FIG. 8 is a diagram illustrating an example of the periphery map 141. The camera 121 and the LiDAR 125 are mounted on the vehicle 100, and the vehicle is traveling on a road. A state at a certain time t is illustrated in FIG. 8(*a*). At the certain time t, the camera 121 and the LiDAR 125 observe a lane marker position 401 in an observation range 405 indicated by a fan-shaped broken line, a road boundary position 402 other than the lane marker, and a point group 403 such as building information, and record the result in the coordinate system of the periphery map 141. FIG. 8(*b*) illustrates a state at time t+N when N further elapses from the time t. At each of times t+1, t+2, . . . , and t+N after the time t, the lane marker position 401 in the observation range 404, the road boundary position 402 other than the lane marker, and the point group 403 such as the building information were observed by the camera 121 and the LiDAR 125. Further, the data observed by using the movement information of the own vehicle obtained from the odometry estimating unit 131 is combined in time series to generate the periphery map 141. As a result, as illustrated in FIG. 8(*b*), the range of the periphery map 141 is enlarged as the vehicle travels.

Figure 9:
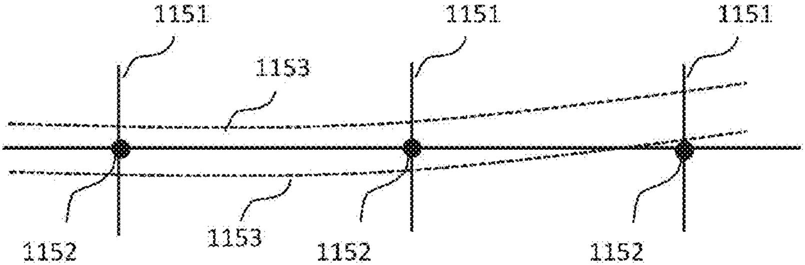
FIG. 9 is a diagram illustrating an example of an error between a reference map and a periphery map.

FIG. 9 is a diagram illustrating an example of an error between the reference map 181 and the periphery map 141. In FIG. 9, a solid line indicates a center position of a road on the reference map 181, and a broken line indicates a detected traveling lane on the periphery map 141.

The periphery map 141 combines and connects sensor information, which is observed at each time while traveling by the camera 121 and the LiDAR 125 as illustrated in FIG. 8, in time series by using the movement information of the own vehicle obtained from the odometry estimating unit 131. However, since the movement information of the own vehicle includes an error, and the reference map 181 includes an error exceeding 1 m unlike a high-accuracy map, it is hard for the feature information of the periphery map 141 and the reference map 181 to be completely identical. Therefore, as illustrated in FIG. 9, an error occurs between the road shape represented by a link 1151 and a node 1152 on the reference map 181 and the road shape generated on the periphery map 141, for example, the center line between the lane markers 1153. In this way, when the periphery map 141 and the reference map 181 do not overlap and do not match, it becomes impossible to refer to both pieces of information. In this regard, in the present embodiment, the partial map group 151 having an offset is intentionally generated, and this partial map group 151 is used by being superposed on the reference map 181. The offset in the partial map group 151 is restored as necessary and used in a seamless manner. Details will be described later.

FIG. 10 is a diagram illustrating an example of matching between the reference map 181 and the partial map 143. FIG. 10(*a*) illustrates feature positions on the reference map 181. Information such as a lane marker position 601, a road boundary position 602 other than the lane marker, a stop line 603, and a crosswalk 604 is included, but there is a position error such as the stop line 603 overlapping the road boundary position 602. FIG. 10(*b*) illustrates the partial map 143 extracted from the periphery map 141. Since information such as a lane marker position 611, a road boundary position 612 other than the lane marker, a stop line 613, a crosswalk 614, and a point group 615 of the building is generated by sensing, the accuracy of the relative position of each feature is relatively high. In addition, since a local range is cut out as the partial map 143, the influence of the error due to the odometry is small within the range of one partial map 143, and also from that viewpoint, the accuracy is high.

The reference map 181 illustrated in FIG. 10(*a*) and the partial map 143 illustrated in FIG. 10(*b*) are matched so as to reduce an error between the same type of information. For example, the lane marker position 601, the road boundary position 602, the stop line 603, and the crosswalk 604 other than the lane marker which are features on the reference map 181 are matched with the lane marker position 611, the road boundary position 612, the stop line 613, and the crosswalk 614 other than the lane marker which are features on the partial map 143.

As a result of aligning the coordinate systems by the matching, FIG. 10(*c*) is obtained. As a result, it is possible to refer to information of both the reference map 181 and the partial map 143. Since the feature information of the reference map 181 has low accuracy, the information of the partial map 143 is basically referred to except for information that cannot be sensed.

FIG. 11 is a diagram illustrating an example of the partial map group 151. FIG. 11(*a*) illustrates an example of a state where the periphery map 141 illustrated in FIG. 5 is recorded as the partial map group 151 by the partial map extracting unit 135 and the partial map matching unit 136. This is a situation where a portion where the error in features between the reference map 181 and the periphery map 141 increases due to an odometry error or the like is cut out as the partial map 143, and is further matched with the reference map 181 to be coordinate-converted, and as a result, an offset occurs between the converted partial maps 144. Although an offset is observed as a whole, the partial map alone is matched with the reference map 181 such that an error is reduced as much as possible.

FIG. 11(*b*) illustrates two converted partial maps 701 and 702 in FIG. 11(*a*), including detailed features. The converted partial map 701 and the converted partial map 702 have high local relative accuracy, but an offset occurs at a boundary portion between the converted partial map 701 and the converted partial map 702. This offset is caused by a difference between the coordinate conversion parameters used for the converted partial map 701 and the coordinate conversion parameters used for the converted partial map 702. The gap parameter calculating unit 137 calculates, as the gap parameter 142, a difference in the coordinate conversion parameters between both, precisely, information indicating a correlation of the coordinate conversion parameters between both. The gap parameter 142 is held for each boundary of the partial map. The converted partial map 701 and the converted partial map 702 can be seamlessly connected by using the gap parameter 142. In the range of the map connecting the converted partial map 701 and the converted partial map 702, the influence of the odometry error is somewhat large, but the local relative accuracy is maintained in the range.

Figure 12:
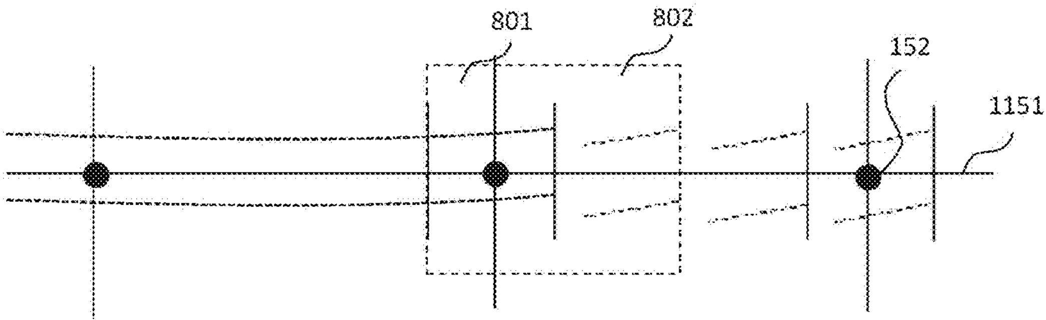
FIG. 12 is a diagram illustrating another example of the partial map group.

FIG. 12 is a diagram illustrating another example of the partial map group 151. In FIG. 12, similarly to FIG. 11(*a*), the periphery map 141 illustrated in FIG. 5 is recorded as the partial map group 151 by the partial map extracting unit 135 and the partial map matching unit 136. FIG. 12 is different from FIG. 11(*a*) in the content of the odometry error, and in this example, not only an error in an azimuth direction but also an error in a distance direction occurs. Also in this case, similarly to FIG. 11(*b*), the local relative accuracy is maintained in each of the converted partial maps 801 and 802. Although there is an offset at a boundary portion between the converted partial maps, information for eliminating the offset is held as the gap parameter 142. Therefore, the converted partial map 144 can be seamlessly connected by using the gap parameter 142.

FIG. 13 is a diagram illustrating an operation of the continuous map generating unit 139. In FIGS. 13(*a*), 13(*b*), and 13(*c*), the vehicle 100 in which the partial map group 151 and the gap parameter 142 in the range illustrated in FIG. 13 have been created travels from left to right in the drawing. The left side in the drawing is the converted partial map 901, and the right side in the drawing is the converted partial map 902. In FIG. 11, a circle with an alternate long and short dash line centered on the vehicle 100 indicates a range necessary for own-position estimation.

In FIG. 13(*a*), since there is sufficient information of the range necessary for own-position estimation within the converted partial map 901 where the vehicle 100 exists, connection between the converted partial maps is unnecessary. In FIG. 13(*b*), the vehicle 100 reaches the vicinity of the boundary between the converted partial map 901 and the converted partial map 902, and the information necessary for own-position estimation is not sufficient only with the converted partial map 901. Therefore, the converted partial map 902 is seamlessly connected with alignment with the converted partial map 901 by using the gap parameter 142, and the own-position estimation based on feature matching is performed on the map obtained by connecting the converted partial map 901 and the converted partial map 902.

In FIG. 13(*c*), the vehicle 100 passes through the gap position and moves on the converted partial map 902. However, since the information of the range necessary for own-position estimation is not sufficient only with the converted partial map 902, seamless connection is made with alignment with the converted partial map 902 by using the gap parameter 142, and the own-position estimation based on feature matching is performed on the map obtained by connecting the partial map 901 and the partial map 902. As described above, the own-position estimating system 10 connects the converted partial maps while changing the converted partial map as a base and performs the own-position estimation and the feature reference.

Figure 14:
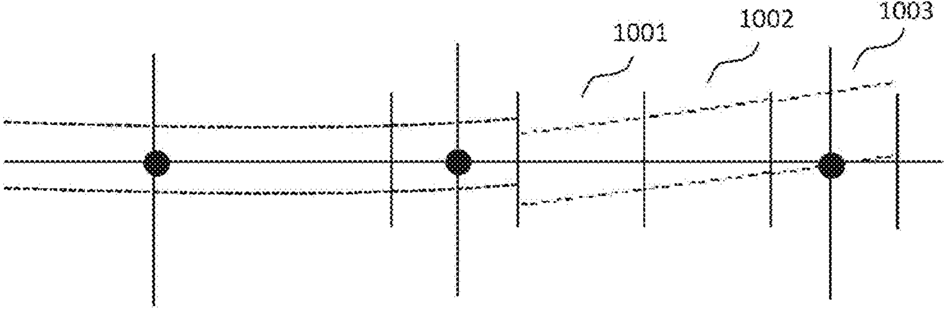
FIG. 14 is a diagram illustrating an example of a generation result by the continuous map generating unit.

FIG. 14 is a diagram illustrating an example of a generation result by the continuous map generating unit 139. In FIG. 13, two adjacent converted partial maps 144 are connected, but a plurality of converted partial maps 144 may be connected in accordance with a range required by an AD/ADAS application or a range required for own-position estimation. In FIG. 14, the converted partial map 1001 and the converted partial map 1002 are connected with the converted partial map 1003 as a base. However, the wider the connection range, the wider a combining range in the odometry, and thus the larger an error in the connected map. Therefore, it is desirable to make connection within a minimum range including the range required by the AD/ADAS application and the range required for own-position estimation.

According to the first embodiment described above, the following operational effects can be obtained.

(1) The vehicle-mounted device includes: the sensor information acquiring unit 201 which acquires sensor information output by the camera 121 or the LiDAR 125 which is a sensor which is mounted on the vehicle 100 and measures a surrounding environment; the reference map storage unit 181K which stores the reference map 181 which is created in advance and is a map of a reference coordinate system which is a predetermined world coordinate system; the odometry information acquiring unit 202 which acquires movement information which is information regarding movement of the vehicle 100 on the basis of an output of the vehicle speed sensor 161 and the steering angle sensor 162 which are sensors mounted on the vehicle 100; the periphery map generating unit 134 that generates the periphery map 141, which is a map in a vehicle coordinate system which is a coordinate system different from the reference coordinate system, on the basis of the sensor information and the movement information; the partial map extracting unit 135 which extracts the partial maps 143, which are regions overlapping each other, from the periphery map 141; and the gap parameter calculating unit 137 which calculates, for a coordinate conversion parameter for converting each of the partial maps 143 into the converted partial map 144 which is a map in the reference coordinate system, the gap parameter 142 which is information regarding at least a correlation of the coordinate conversion parameter between the partial maps adjacent to each other. The partial map extracting unit 135 extracts the new partial map 143 when an amount of offset from the reference map 181 is equal to or larger than a predetermined threshold. Therefore, the vehicle-mounted device 101 can create a map having an error equal to or less than a certain value regardless of a region size.

(2) The periphery map 141 is divided into a confirmed region which is a region of the partial map of which the region is confirmed, and an unconfirmed region obtained by excluding the confirmed region from the periphery map. The vehicle-mounted device 101 includes the partial map extracting unit 135 which, in a case where an amount of offset from the reference map in an unconfirmed converted partial map obtained by calculating the unconfirmed region by using the latest coordinate conversion parameter is equal to or larger than the predetermined threshold, extracts, as a region of a new partial map, the unconfirmed region corresponding to the unconfirmed converted partial map having an amount of offset less than the predetermined threshold, and the partial map matching unit 136 which calculates the latest coordinate conversion parameter by matching, with the reference map 181, a matching target region obtained by excluding a region of the new partial map from the unconfirmed region. Therefore, in any of the converted partial maps 144, an error from the reference map 181 can be suppressed to less than a predetermined value.

(3) The vehicle-mounted device 101 includes the vehicle general location estimating unit 132 which specifies a position of the vehicle in the reference coordinate system on the basis of external information independent of movement of the vehicle 100, for example, the position information calculated by the GNSS 126. The partial map matching unit 136 determines a region to be matched on the reference map 181 on the basis of the position of the vehicle calculated by the vehicle general location estimating unit 132. Therefore, the target region on the reference map 181 can be narrowed on the basis of the latitude and longitude calculated by the GNSS 126, and a calculation amount can be greatly reduced as compared with a case where the latitude and longitude are unknown.

(4) The vehicle-mounted device 101 includes the storage unit 113 which stores the partial map group 151 which is a set of the converted partial maps 144 having different coordinate conversion parameters φ to be applied, and the gap parameter 142 including at least information regarding a correlation of the coordinate conversion parameters q between the converted partial maps 144 adjacent to each other. The coordinate conversion parameter φ is a parameter for conversion into the second coordinate system adopted by the converted partial map 144, that is, the reference coordinate system from the second coordinate system, that is, the vehicle measurement coordinate system. In any of the converted partial maps 144, an amount of offset from the reference map 181 which is a map of the first coordinate system created in advance is equal to or less than a predetermined threshold. The vehicle-mounted device 101 includes the own-position estimating unit 138 which specifies a position of the vehicle 100 on the converted partial map 144 on the basis of an output of a sensor mounted on the vehicle 100, and the continuous map generating unit 139 which corrects relative positions of two converted partial maps 144 adjacent to each other on the basis of the gap parameter 142 regarding the two converted partial maps 144 when the position of the vehicle 100 estimated by the own-position estimating unit 138 approaches a boundary between the two converted partial maps 144, and generates the continuous map 145 in which the two converted partial maps 144 are continuous. Therefore, highly accurate position estimation can be realized by using the converted partial map 144 which is a map having an error equal to or less than a certain value regardless of a region size.

First Modification

In the first embodiment described above, the correlation of the conversion parameters between adjacent converted partial maps 144, that is, "$f(\varphi 2)^T * f(\varphi 1)$" is stored as the gap parameter 142. However, "φ2" and "φ1", which are a combination of conversion parameters, may be stored as the gap parameter 142, or the conversion parameter itself in each converted partial map 144, for example, "φ2" may be stored as the gap parameter 142. That is, the gap parameter 142 only needs to be a parameter used for computation necessary for seamlessly connecting the converted partial maps 144, and can be stored in various forms.

Second Modification

The vehicle-mounted device 101 may transmit the partial map group 151 stored in the storage unit 113 via the communication device 182 to a server or the like existing outside the vehicle 100. In addition, the partial map group 151 stored in the server via the communication device 182 by the automatic driving device 102 mounted on another vehicle may be stored via the communication device 182 in the storage unit 113 and used for own-position estimation.

Third Modification

In the first embodiment described above, as shown in steps S305 to S307 of FIG. 7, it has been determined whether or not to coordinate-convert the unconfirmed region of the periphery map 141, evaluate an offset from the reference map 181, and extract the region as the partial map 143. However, whether or not to extract the partial map 143 may be determined by another method. For example, the accumulated error of the odometry estimating unit 131 may be estimated or calculated, and a new partial map 143 may be extracted each time the accumulated error exceeds a predetermined threshold.

For example, the following processing may be performed instead of steps S305 to S307 in FIG. 7. That is, the position of the vehicle 100 calculated by the odometry estimating unit 131 is compared with the position of the vehicle 100 calculated by the vehicle general location estimating unit 132, and in a case where a difference between both is equal to or larger than a predetermined threshold, the processing of step S305 is performed, and the process proceeds to step S308. In a case where the difference between both companies is less than the predetermined threshold, the process returns to step S301.

In addition, instead of comparing the position of the vehicle 100 calculated by the odometry estimating unit 131 with the position of the vehicle 100 calculated by the vehicle general location estimating unit 132, the magnitude of the accumulated error may be estimated by statistical processing. The error of the sensor may be affected by the lapse of time, temperature, and vibration. Therefore, the correlation between these and the error of the sensor may be examined in advance, the accumulated error of the sensor may be estimated based on the lapse of time, the temperature change, and the magnitude of vibration, and it may be determined whether or not the estimated accumulated error is equal to or larger than a predetermined threshold.

Fourth Modification

In the first embodiment described above, the coordinate system of the partial map group 151 generated by the map generating unit 250 has been the reference coordinate system. However, the map generating unit 250 may use, as the vehicle measurement coordinate system, the coordinate system of the partial map group 151 to be generated. In other words, the partial map group 151 may include the partial map 143 indicated by reference numerals P1 and P2 in FIG. 6 instead of the converted partial map 144 indicated by reference numerals Q1 and Q2 in FIG. 6. In addition, the gap parameter 142 in this case is desirably a set of conversion parameters in each partial map 143. Note that, even in a case where the partial map group 151 is stored with the configuration of the present modification, each conversion parameter is stored, and thus a continuous map can be generated similarly to the first embodiment.

Fifth Modification

In the first embodiment described above, it has been described that the accuracy of the periphery map 141 is higher than that of the reference map 181 in a local area, but the accuracy of the reference map 181 is higher than that of the periphery map 141 in a wide area. However, the accuracy of both is not limited thereto. For example, in both local and wide areas, the accuracy of the periphery map 141 may be higher than that of the reference map 181, or the accuracy of the reference map 181 may be higher than that of the periphery map 141. That is, the first embodiment described above can be applied regardless of the accuracy of the reference map 181 and the periphery map 141.

Second Embodiment

A second embodiment of the vehicle-mounted device which is a computing device and an own-position estimating device will be described with reference to FIG. 15. In the following description, the same components as those of the first embodiment are denoted by the same reference numerals, and differences will be mainly described. The points not particularly described are the same as those in the first embodiment. The present embodiment is different from the first embodiment mainly in that the partial map group 151 and the gap parameter 142 are generated outside the vehicle.

Figure 15:
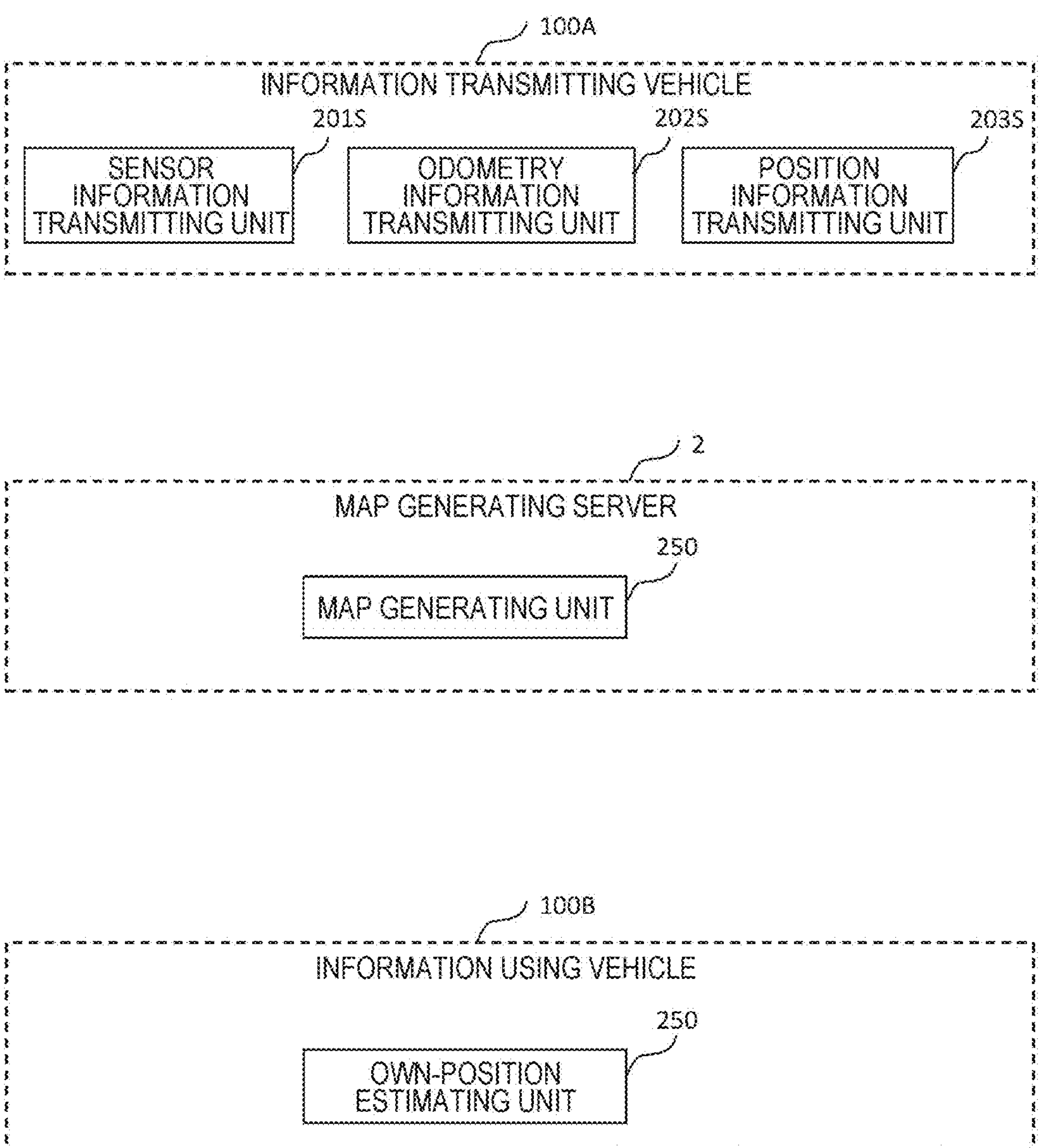
FIG. 15 is a schematic configuration diagram of a position estimating system according to a second embodiment.

FIG. 15 is a schematic configuration diagram of a position estimating system according to the second embodiment. The position estimating system includes an information transmitting vehicle 100A, the map generating server 2, and an information using vehicle 100B. In the present embodiment, the map generating server 2 generates the partial map group 151 and the gap parameter 142. The information transmitting vehicle 100A transmits, to the map generating server 2, information necessary for generating the partial map group 151 and the gap parameter 142. The information using vehicle 100B receives the partial map group 151 and the gap parameter 142 from the map generating server 2 and uses them. Each configuration will be described in detail.

Although not illustrated in FIG. 15, the information transmitting vehicle 100A and the information using vehicle 100B include the camera 121, the LiDAR 125, the GNSS 126, the vehicle speed sensor 161, the steering angle sensor 162, and the communication device 182. The information transmitting vehicle 100A may not include the vehicle-mounted device 101 and the reference map 181. The information using vehicle 100B and the map generating server 2 include the reference map 181. The information transmitting vehicle 100A and the information using vehicle 100B communicate with the map generating server 2 by using the communication device 182.

A sensor information transmitting unit 201S acquires a signal output from each external sensor and transmits the signal to the map generating server 2. An odometry information transmitting unit 202S acquires signals such as a speed and a steering angle regarding odometry estimation output from the vehicle speed sensor 161 and the steering angle sensor 162, and transmits the acquired signals to the map generating server 2. A position information transmitting unit 203S acquires latitude and longitude information indicating the current position of the vehicle 100 output from the GNSS 126 and transmits the latitude and longitude information to the map generating server 2.

The sensor information transmitting unit 201S, an odometry information transmitting unit 202S, and a position information transmitting unit 203S may transmit the acquired signals to the map generating server 2 each time, may transmit the acquired signals every predetermined period, for example, every hour, or may transmit the acquired signals every predetermined event, for example, every time an ignition switch is turned off. The sensor information transmitting unit 201S, the odometry information transmitting unit 202S, and the position information transmitting unit 203S desirably transmit the acquired signals with a time stamp, instead of transmitting the acquired signals as they are.

The map generating server 2 includes a CPU which is a central processing unit, a ROM which is a read-only storage device, and a RAM which is a readable/writable storage device, and operates as the map generating unit 250 by the CPU developing a program stored in the ROM in the RAM and executing the program. The map generating server 2 may realize the map generating unit 250 by using an FPGA or an ASIC instead of a combination of the CPU, the ROM, and the RAM. In addition, the map generating server 2 may realize the map generating unit 250 by a combination of different configurations, for example, a combination of the CPU, the ROM, the RAM, and the FPGA, instead of the combination of the CPU, the ROM, and the RAM.

The processing of the map generating unit 250 included in the map generating server 2 is substantially the same as the processing described in the first embodiment. A difference is that the sensor information acquiring unit 201, the odometry information acquiring unit 202, and the position information acquiring unit 203 use the information of the sensor transmitted from the information transmitting vehicle 100A instead of directly acquiring the information from the sensor.

The map generating server 2 transmits the generated partial map group 151 and the gap parameter 142 to the information using vehicle 100B.

The information using vehicle 100B includes the position estimating unit 350, the reference map 181, the storage unit 113, and the vehicle control device 190 illustrated in FIG. 4. The partial map group 151 and the gap parameter 142 stored in the storage unit 113 are received from the map generating server 2 by using the communication device 182. Since the partial map group 151 and the gap parameter 142 are read into the position estimating unit 350 via the communication module 114, it can be said that the position estimating unit 350 includes the communication module 114 which receives the partial map group 151 and the gap parameter 142 from the outside via the communication device 182.

According to the second embodiment described above, the following operational effects can be obtained.

(5) The position estimating unit 350 is mounted on the information using vehicle 100B. The position estimating unit 350 includes the communication module 114 which receives the partial map group 151 and the gap parameter 142 from the outside via the communication device 182. Therefore, the position estimating unit 350 can use the partial map group 151 and the gap parameter 142 generated on the basis of the sensor information acquired by the information transmitting vehicle 100A, which is another vehicle, so that highly accurate position estimation can be realized even at a place where the vehicle travels for the first time.

Note that the present invention is not limited to the above-described embodiments, and various modifications are included. For example, the above-described embodiments have been described in detail for easy understanding of the present invention and are not necessarily limited to those having all the described configurations. Other embodiments considered within the scope of the technical idea of the present invention are also included within the scope of the present invention. In addition, a part of the configuration of a certain embodiment can be replaced with the configuration of another embodiment, and the configuration of another embodiment can be added to the configuration of a certain embodiment. It is possible to add, delete, and replace other configurations for a part of the configuration of each embodiment. In addition, the vehicle 100 may include an input/output interface (not illustrated), and if needed, a program may be read from another device via a medium which can be used by the input/output interface and the vehicle-mounted device 101. Here, the medium refers to, for example, a storage medium removable from the input/output interface or a communication medium, that is, a wired, wireless, light or other network or a carrier wave or digital signal propagating through the network. In addition, some or all of the functions implemented by the program may be implemented by a hardware circuit or an FPGA. In addition, each of the above-described configurations, functions, and the like may be realized by software by a processor interpreting and executing a program for realizing each function. Information such as a program, a table, and a file for realizing each function can be stored in a memory, a recording device such as a hard disk and a solid state drive (SSD), or a recording medium such as an IC card, an SD card, or a DVD.

In the above-described embodiments and modifications, the configuration of the functional block is merely an example. Some functional configurations illustrated as separate functional blocks may be integrally configured, or a configuration illustrated in one functional block diagram may be divided into two or more functions. In addition, some of the functions of each functional block may be included in another functional block.

REFERENCE SIGNS LIST

2 map generating server
10 own-position estimating system
100 vehicle
100A information transmitting vehicle
100B information using vehicle
101 vehicle-mounted device
114 communication module
134 periphery map generating unit
135 partial map extracting unit
136 partial map matching unit
137 gap parameter calculating unit
138 own-position estimating unit
139 continuous map generating unit
141 periphery map
142 gap parameter
143 partial map
144 converted partial map
145 continuous map
151 partial map group
181 reference map
250 map generating unit
350 position estimating unit
UP unconfirmed region
UQ unconfirmed converted partial map

The invention claimed is:

1. A computing device comprising:

a processor configured to:

store a reference map in a memory;

acquire environment information and movement information from one or more sensors mounted on a vehicle;

generate a periphery map using the environment information and the movement information;

extract, from the periphery map, partial maps comprising regions that are spatially partitioned such that adjacent partial maps are non-overlapping, wherein the periphery map is divided into (i) one or more confirmed regions corresponding to the extracted partial maps and (ii) at least one unconfirmed region excluding the one or more confirmed regions;

determine a respective one of a plurality of coordinate conversion parameters for each of the partial maps by matching each of the partial maps with the reference map to generate a corresponding one of a plurality of converted partial maps aligned with the reference map;

compute, based on the coordinate conversion parameters for the converted partial maps, for each boundary between the converted partial maps that are adjacent to each other, a gap parameter comprising information regarding at least a correlation between the coordinate conversion parameters of the converted partial maps that are adjacent to each other;

determine an offset between (i) an unconfirmed a converted partial map associated with the at least one unconfirmed region and (ii) the reference map;

generate, in response to the offset being greater than or equal to a predetermined threshold, a new partial map by setting, as the new partial map, a region of the at least one unconfirmed region corresponding to a region of the unconfirmed converted partial map having an offset from the reference map less than the predetermined threshold; and generate, based on a location of the vehicle, a continuous map by connecting the new partial map with at least one of the converted partial maps adjacent to the new partial map using the gap parameter between the new partial map and the at least one adjacent converted partial map.

2. The computing device according to claim 1, wherein the processor is configured to:

calculate a latest coordinate conversion parameter by matching, with the reference map, a matching target region obtained by excluding a region of the new partial map from the at least one unconfirmed region; and based on an offset from the reference map in an unconfirmed converted partial map, obtained by calculating the at least one unconfirmed region using the latest coordinate conversion parameter, being greater than or equal to the predetermined threshold, extract, as the new partial map, the at least one unconfirmed region corresponding to the unconfirmed converted partial map having an offset of less than the predetermined threshold.

3. The computing device according to claim 2, wherein the processor is configured to:

detect, based on the environment information and the movement information, a position of the vehicle; and determine a matching target region in the reference map based on the position of the vehicle.

4. The computing device according to claim 1, wherein the processor is configured to:

store a partial map group comprising a set of the converted partial maps, and the gap parameter;

detect, based on the environment information and the movement information, a position of the vehicle on the converted partial map;

correct relative positions of two converted partial maps adjacent to each other using the gap parameter associated with the two converted partial maps based on the position of the vehicle approaching a boundary between the two converted partial maps; and generate a continuous map in which the two converted partial maps are continuous subsequent to correcting the relative positions of the two converted partial maps.

5. A position estimating device comprising:

a processor configured to:

store, in a memory, (i) a reference map, (ii) a partial map group comprising partial maps representing respective regions of a periphery map that are spatially partitioned such that adjacent partial maps are non-overlapping, (iii) a plurality of coordinate conversion parameters associated with converted partial maps, and (iv) a gap parameter for each boundary between the converted partial maps that are adjacent to each other, the gap parameter comprising information regarding a correlation between the coordinate conversion parameters of the converted partial maps that are adjacent to each other, wherein;

the periphery map is divided into (i) one or more confirmed regions corresponding to the partial maps and (ii) at least one unconfirmed region excluding the one or more confirmed regions, a respective one of the plurality of coordinate conversion parameters is determined for each of the partial maps by matching each of the partial maps with the reference map, and the coordinate conversion parameters are applied to the partial maps for converting the partial maps into the converted partial maps aligned with the reference map;

determine an offset between (i) an unconfirmed converted partial map associated with the at least one unconfirmed region and (ii) the reference map;

responsive to the offset being greater than a predetermined threshold, update the partial map group to reduce the offset associated with the converted partial map to be at or below the predetermined threshold;

detect, based on an output from one or more sensors mounted on a vehicle, a position of a vehicle on the unconfirmed converted partial map in the partial map group; and based on the detected position of the vehicle approaching a boundary between two converted partial maps, generate a continuous map in which the two converted partial maps are continuous by correcting relative positions of the two converted partial maps using the gap parameter.

6. The position estimating device according to claim 5, wherein the position estimating device is mounted on the vehicle, and the processor is configured to:

receive the partial map group and the gap parameter from an external device.

7. A method, comprising:

storing, by a processor, a reference map in a memory;

acquiring, by the processor, environment information and movement information from one or more sensors mounted on a vehicle;

generating, by the processor, a periphery map using the environment information and the movement information;

extracting, by the processor from the periphery map, partial maps, comprising regions that are spatially partitioned such that adjacent partial maps are non-overlapping, wherein the periphery map is divided into (i) one or more confirmed regions corresponding to the extracted partial maps and (ii) at least one unconfirmed region excluding the one or more confirmed regions;

determining, by the processor, a respective one of a plurality of coordinate conversion parameters for each of the partial maps by matching each of the partial maps with the reference map to generate a corresponding one of a plurality of converted partial maps aligned with the reference map;

computing, by the processor based on the coordinate conversion parameters for the converted partial maps, for each boundary between the converted partial maps that are adjacent to each other, a gap parameter comprising information regarding at least a correlation between the coordinate conversion parameters of the converted partial maps that are adjacent to each other;

determining, by the processor, an offset between (i) an unconfirmed converted partial map associated with the at least one unconfirmed region and (ii) the reference map;

generating, by the processor, in response to the offset being greater than or equal to a predetermined threshold, a new partial map by setting, as the new partial map, a region of the at least one unconfirmed region corresponding to a region of the unconfirmed converted partial map having an offset from the reference map less than the predetermined threshold; and generating, by the processor based on a location of the vehicle, a continuous map by connecting the new partial map with at least one of the converted partial maps adjacent to the new partial map using the gap parameter between the new partial map and the at least one adjacent converted partial map.

* * * * *